United States Patent
Zheng et al.

(10) Patent No.: US 12,219,428 B2
(45) Date of Patent: Feb. 4, 2025

(54) SATELLITE SIGNAL ENVIRONMENT DETERMINATION AND/OR POSITION ESTIMATE SELECTION

(71) Applicant: QUALCOMM Incorporated, San Diego, CA (US)

(72) Inventors: Bo Zheng, Sunnyvale, CA (US); Chandrasekhar Jayaram, Bangalore (IN); Gengsheng Zhang, Cupertino, CA (US); Yinghua Yang, San Jose, CA (US); Subrahmanyam Anand Mantravadi Venkata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/390,923

(22) Filed: Jul. 31, 2021

(65) Prior Publication Data
US 2023/0035711 A1    Feb. 2, 2023

(51) Int. Cl.
*H04W 4/029*    (2018.01)

(52) U.S. Cl.
CPC .................. *H04W 4/029* (2018.02)

(58) Field of Classification Search
CPC ..... H04W 4/023; H04W 4/027; H04W 4/029; H04W 4/06; H04W 4/40; H04W 40/22; H04W 84/12; H04W 84/18
USPC ........... 455/456.6, 456.1, 11, 205, 436, 63.1, 455/446, 425, 67.15, 562.1
See application file for complete search history.

(56) References Cited

U.S. PATENT DOCUMENTS 9,055,516 B2 * 6/2015 Yamasaki ............. H04W 40/12
2006/0234697 A1 * 10/2006 Fernandez ............. H04B 17/23
455/425

(Continued)

OTHER PUBLICATIONS

Combettes C., et al., "EKF Based on Two FDE Schemes for GNSS Vehicle Navigation", IEEE 93rd Vehicular Technology Conference (VTC2021-SPRING), IEEE, Apr. 25, 2021, pp. 1-6, XP033927045, DOI: 10.1109/VTC2021-SPRING51267.2021.9448987, Abstract, Figure 1, Table I Section: II.E. Fault Detetction and Exclusion.

(Continued)

*Primary Examiner* — Joseph Arevalo
(74) *Attorney, Agent, or Firm* — Sunstein LLP

(57) ABSTRACT

A method includes: receiving one or more positioning signals; determining that a UE is line-of-sight to fewer than a threshold number of positioning signal sources; determining a first position estimate hypothesis for the UE using a first position estimating process and one or more first measurements of the positioning signal(s); determining a second position estimate hypothesis for the UE using a second position estimating process and one or more second measurements of the positioning signal(s), wherein the second position estimating process uses a second parameter value of a parameter and the parameter is absent from the first position estimating process or has a first parameter value that is different from the second parameter value; and reporting a reported position estimate based on the first position estimate hypothesis or the second position estimate hypothesis in response to the UE being line-of-sight to fewer than the threshold number of positioning signal sources.

23 Claims, 12 Drawing Sheets

(56) References Cited

U.S. PATENT DOCUMENTS

| | | | | |
|---|---|---|---|---|
| 2006/0235753 | A1* | 10/2006 | Kameyama | G06Q 30/0201 |
| | | | | 705/15 |
| 2007/0192038 | A1* | 8/2007 | Kameyama | G06F 16/436 |
| | | | | 707/E17.143 |
| 2010/0176992 | A1 | 7/2010 | T'Siobbel | |
| 2011/0244891 | A1 | 10/2011 | Ghinamo | |
| 2012/0099763 | A1* | 4/2012 | Katoh | G06V 10/22 |
| | | | | 382/103 |
| 2015/0039220 | A1 | 2/2015 | Georgy et al. | |
| 2016/0258777 | A1* | 9/2016 | Bodake | G06F 3/04817 |
| 2017/0195847 | A1* | 7/2017 | Reed | H04W 64/006 |
| 2019/0200245 | A1* | 6/2019 | Khan | H04W 24/02 |
| 2020/0217918 | A1* | 7/2020 | Rydén | G01S 5/0218 |
| 2021/0235359 | A1* | 7/2021 | Caporal Del Barrio | |
| | | | | H04L 25/0212 |
| 2022/0091048 | A1* | 3/2022 | Xu | G06F 3/04812 |
| 2022/0381870 | A1* | 12/2022 | Sundaresan | G01S 5/0264 |
| 2023/0196364 | A1* | 6/2023 | Ogatsu | G06Q 20/208 |
| | | | | 705/44 |

OTHER PUBLICATIONS

Geng C., et al., "H-Blade: A Bayesian Probabilistic GNSS/LTE-OTDOA Hybrid Localization Algorithm for Harsh Environments", 52nd Asilomar Conference on Signals, Systems, and Computers, IEEE, Oct. 28, 2018, pp. 559-563, XP033521184, DOI: 10.1109/ACSSC.2018.8645454, Abstract, Figure 1, Section: III. H-Blade: Bayesian Probabilistic Hybrid Positioning with Outlier Removal.

International Search Report and Written Opinion—PCT/US2022/037045—ISA/EPO—Mar. 1, 2023.

Han H., et al., "GPS/BDS/INS Tightly Coupled Integration Accuracy Improvement Using an Improved Adaptive Interacting Multiple Model with Classified Measurement Update", Chinese Journal of Aeronautics, Elsevier, Amsterdam, NL, vol. 31, No. 3, Dec. 27, 2017, XP085364857, pp. 556-566, Figure 1, Sections: 1. Introduction, 3. Adaptive IMM Algorithm.

Partial International Search Report—PCT/US2022/037045—ISA/EPO—Nov. 8, 2022.

* cited by examiner

SATELLITE SIGNAL ENVIRONMENT DETERMINATION AND/OR POSITION ESTIMATE SELECTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment includes: a receiver configured to receive one or more positioning signals; a memory; and a processor, communicatively coupled to the receiver and the memory, configured to: determine that the user equipment is line-of-sight relative to fewer than a threshold number of positioning signal sources; determine a first position estimate hypothesis for the user equipment using a first position estimating process and one or more first measurements of the one or more positioning signals; determine a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and report a reported position estimate based on the first position estimate hypothesis or the second position estimate hypothesis in response to the user equipment being line-of-sight to fewer than the threshold number of positioning signal sources.

In an embodiment, a position estimate reporting method includes: receiving, at a user equipment, one or more positioning signals; determining that the user equipment is line-of-sight relative to fewer than a threshold number of positioning signal sources; determining a first position estimate hypothesis for the user equipment using a first position estimating process and one or more first measurements of the one or more positioning signals; determining a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and reporting a reported position estimate based on the first position estimate hypothesis or the second position estimate hypothesis in response to the user equipment being line-of-sight to fewer than the threshold number of positioning signal sources.

In an embodiment, a user equipment includes: means for receiving one or more positioning signals; means for determining that the user equipment is line-of-sight relative to fewer than a threshold number of positioning signal sources; means for determining a first position estimate hypothesis for the user equipment using a first position estimating process and one or more first measurements of the one or more positioning signals; means for determining a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and means for reporting a reported position estimate based on the first position estimate hypothesis or the second position estimate hypothesis in response to the user equipment being line-of-sight to fewer than the threshold number of positioning signal sources.

In an embodiment, a non-transitory, processor-readable storage medium includes processor-readable instructions to cause a processor to: determine that a user equipment is line-of-sight relative to fewer than a threshold number of positioning signal sources; determine a first position estimate hypothesis for the user equipment using a first position estimating process and one or more first measurements of one or more positioning signals; determine a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and report a reported position estimate based on the first position estimate hypothesis or the second position estimate hypothesis in response to the user equipment being line-of-sight to fewer than the threshold number of positioning signal sources.

In an embodiment, a user equipment includes: a receiver configured to receive positioning signals; a memory; and a processor, communicatively coupled to the receiver and the memory, configured to: determine one or more position estimate hypotheses for the user equipment based on the positioning signals; and determine that the user equipment is line-of-sight to fewer than a threshold number of positioning signal sources corresponding to the positioning signals based on the one or more position estimate hypotheses for the user equipment.

In an embodiment, a method at a user equipment includes: determining one or more position estimate hypotheses for the user equipment based on positioning signals; and determining that the user equipment is line-of-sight to fewer than a threshold number of positioning signal sources corresponding to the positioning signals based on the one or more position estimate hypotheses for the user equipment.

In an embodiment, a user equipment includes: means for determining one or more position estimate hypotheses for the user equipment based on positioning signals; and means for determining that the user equipment is line-of-sight to fewer than a threshold number of positioning signal sources corresponding to the positioning signals based on the one or more position estimate hypotheses for the user equipment.

In an embodiment, a non-transitory, processor-readable storage medium includes processor-readable instructions to cause a processor to: determine one or more position estimate hypotheses for a user equipment based on positioning signals; and determine that the user equipment is line-of-sight to fewer than a threshold number of positioning signal sources corresponding to the positioning signals based on the one or more position estimate hypotheses for the user equipment.

DETAILED DESCRIPTION

Figure 1:
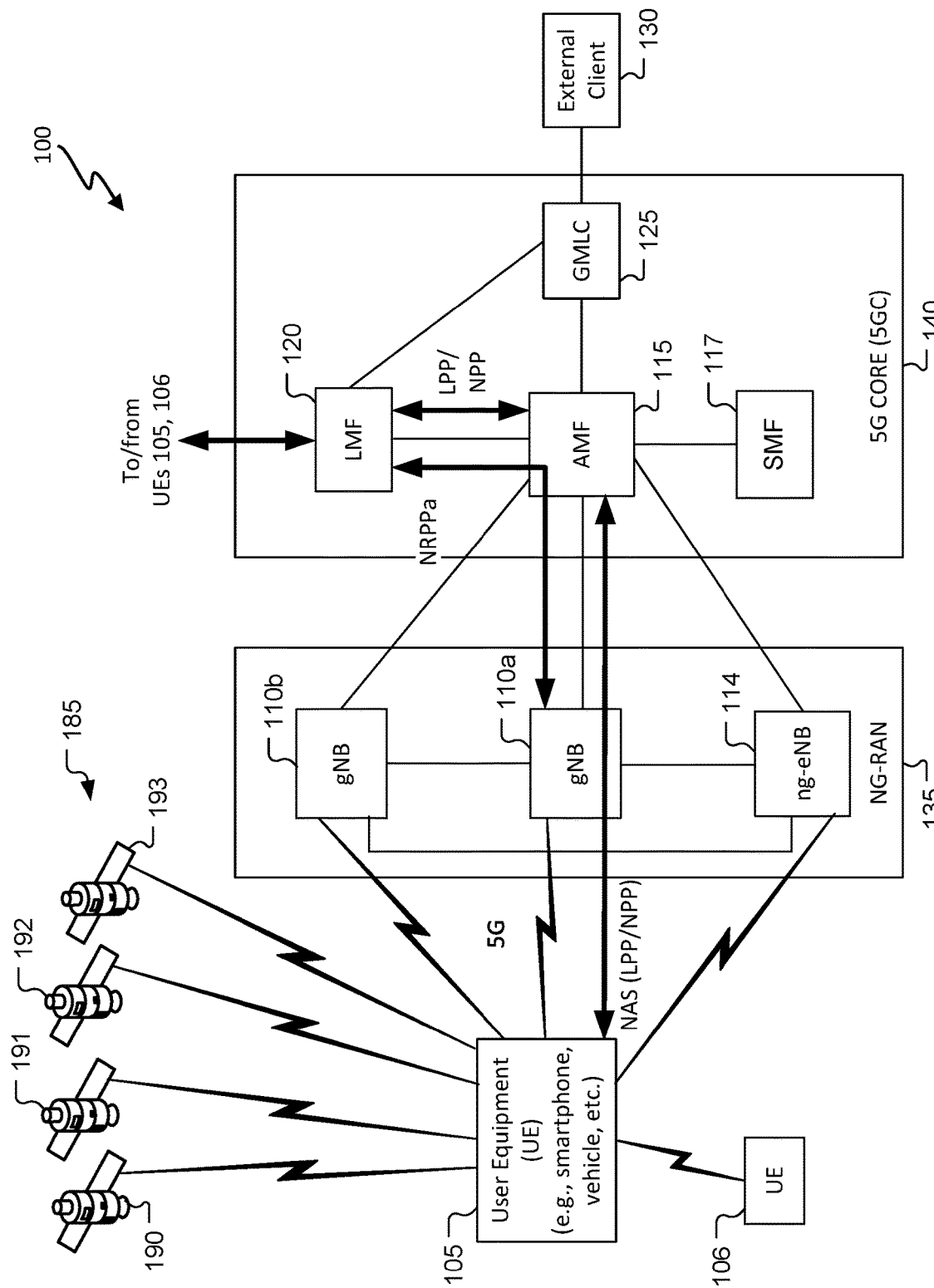
FIG. 1 is a simplified diagram of an example wireless communications system.

Techniques are discussed herein for determining whether a user equipment (UE) is disposed in a challenging environment for measuring positioning signals, e.g., satellite positioning signals or positioning reference signals. For example, positioning signals may be used to determine a position estimate for the UE and one or more metrics (e.g., uncertainty) for the position estimate determined. The UE may be determined to be in a challenging environment or not based on the one or more metrics. Also or alternatively, one or more measurements of one or more positioning signals may be used to determine whether the UE is in a challenging environment. A combination of the positioning signal measurement(s) and the position estimate may be used to determine whether the UE is in a challenging environment. For example, if the position estimate is indicative of the UE not being in a challenging environment but the measurement(s) is(are) indicative of the UE being in a challenging environment, then the UE may be determined not to be in a challenging environment. Other implementations, however, may be used. Further, while the discussion herein may focus on satellite positioning signals, other positioning signals may be used, e.g., cellular positioning signals, WiFi positioning signals, etc.

Techniques are also discussed herein for determining and reporting a position estimate for the UE. For example, based on the UE being in a challenging environment, one or more position estimates may be determined using process noise. Multiple position estimates may be determined using the same process noise, e.g., to propagate a covariance matrix of a Kalman filter. Multiple position estimate hypotheses may be determined with each of the hypotheses determined using a different position estimate seed and/or a different process noise. The position estimate seed and/or the process noise may be dynamically determined. The position estimate hypotheses may be ordered according to one or more criteria (e.g., position uncertainty, fit to a dynamic model (e.g., a Kalman filter)). Measurements corresponding to the best position estimate hypothesis may be screened, e.g., such that any measurement not meeting an aggressive threshold is ignored and remaining measurements are used to determine a candidate position estimate. If the candidate position estimate meets a desired quality of service, then the candidate position estimate may be reported. Otherwise, a less-aggressive threshold may be applied to the measurements and the remaining measurements used to determine a new candidate position estimate that may be reported if the new candidate position estimate meets the desired quality of service. If the new candidate position estimate does not meet the desired quality of service, then the candidate position estimate determination and evaluation process may be repeated for the next-best position estimate hypothesis. Other implementations, however, may be used.

Items and/or techniques described herein may provide one or more of the following capabilities, as well as other capabilities not mentioned. Position estimate (e.g., first fix and/or subsequent fix) accuracy, reliability, and/or availability may be improved. Fast convergence to user equipment position may be provided. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e g, V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
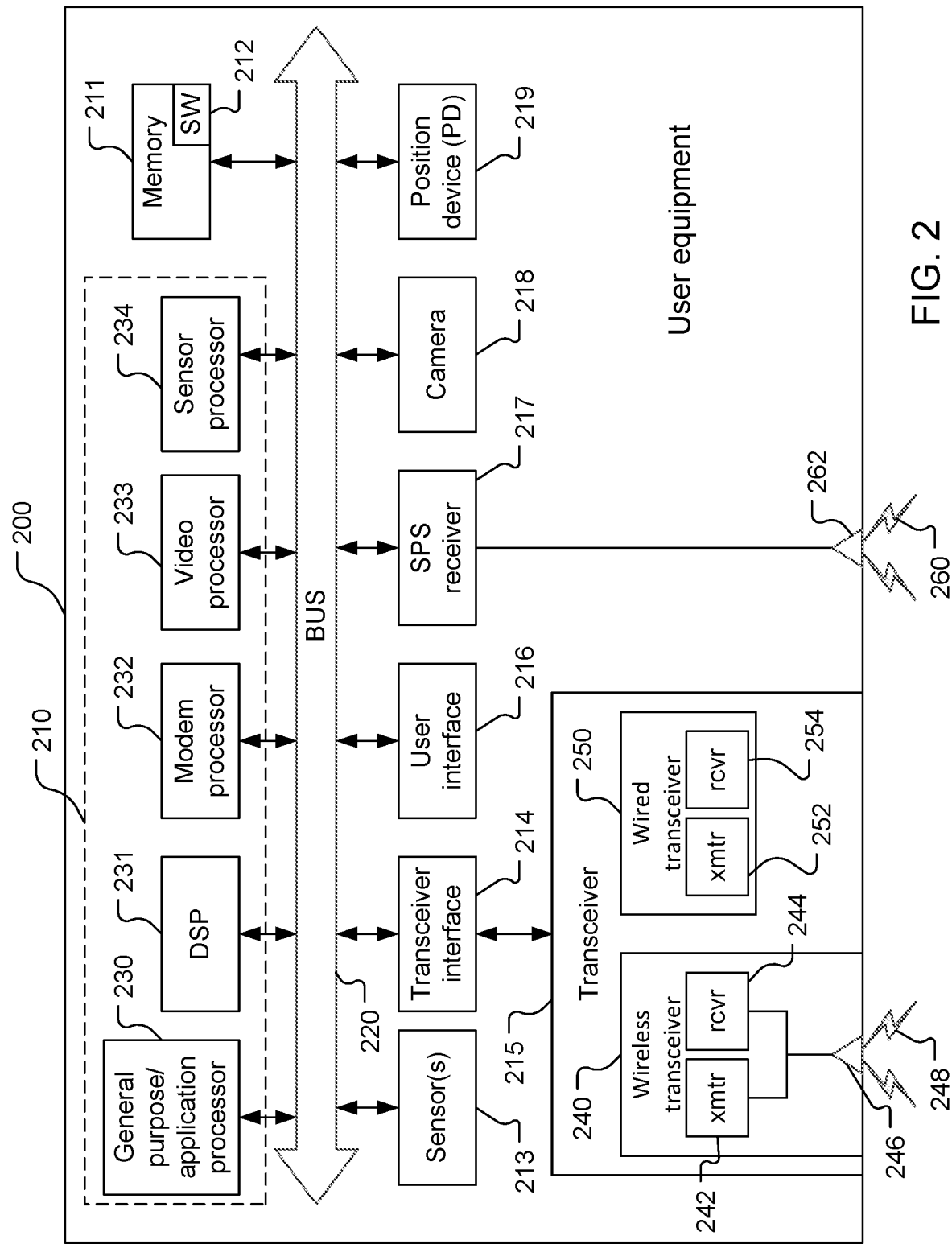
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
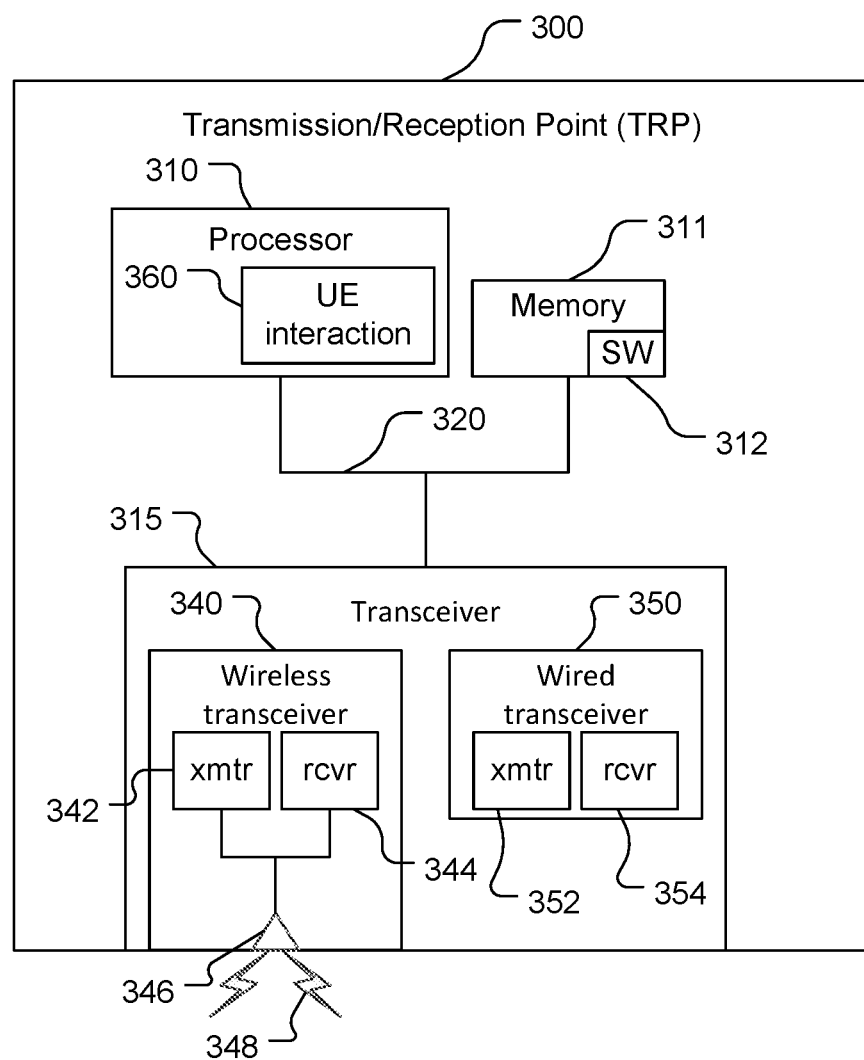
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
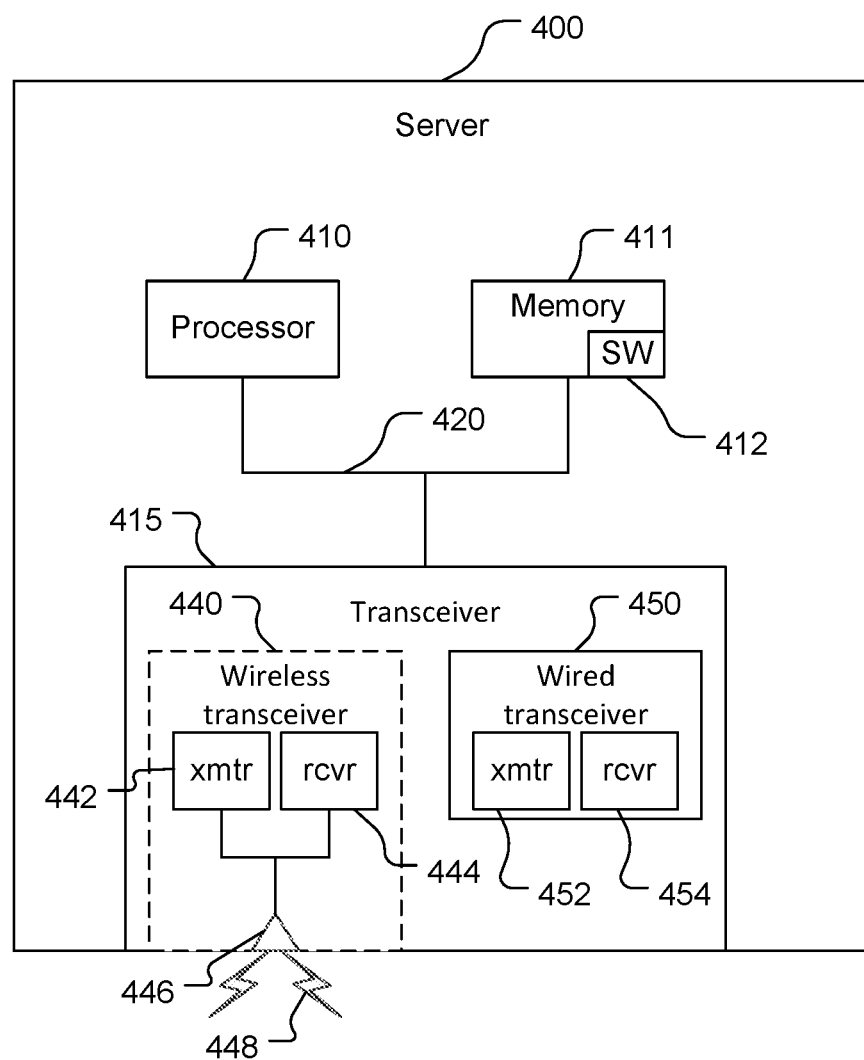
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{RX-TX}$ or $UE_{RX-TX}$) between the ToA of the RTT measurement signal and the transmission time of the RTT response message in a payload of each RTT response message. The RTT response message would include a reference signal from which the base station can deduce the ToA of the RTT response. By comparing the difference $T_{Rx \to Tx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning in Challenging Environments

Figure 5:
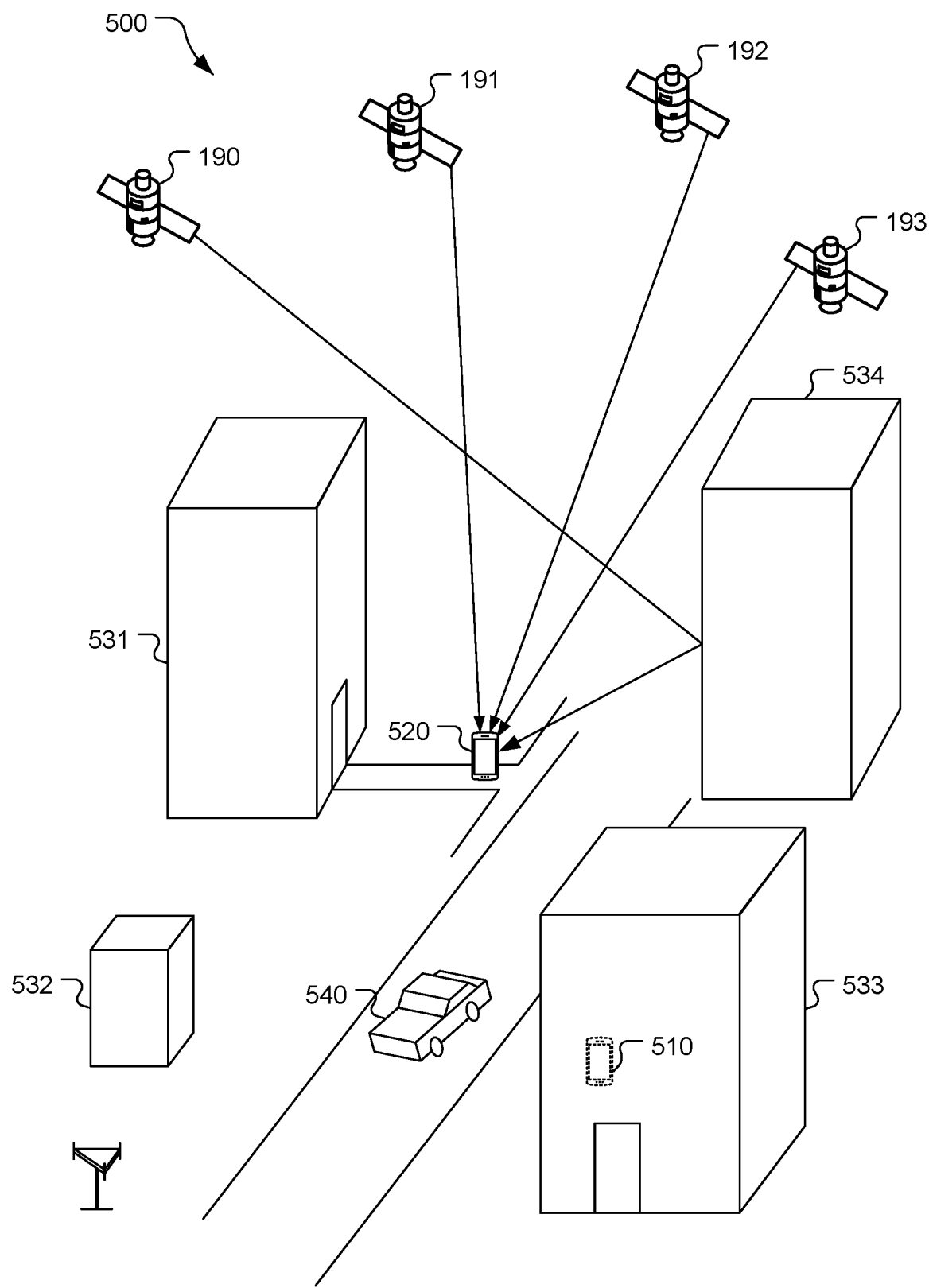
FIG. 5 is a simplified perspective view of an environment containing different environments for positioning.

Referring to FIG. 5, UEs may move between different environments that may or may not present challenges for determining positions of the UEs based on received positioning signals. For example, within an environment 500, UEs 510, 520 may move between indoor environments (e.g., in any of buildings 531, 532, 533, 534) and outdoor environments. Different environments may present different abilities of the UEs to determine accurate position estimates within a desired amount of time. For example, indoor regions may be characterized by low signal strength of cellular positioning signals and/or low signal strength of SPS signals (e.g., below respective signal strength thresholds) while outdoor regions with open sky may be characterized by high signal strength of cellular positioning signals and/or high signal strength of SPS signals (e.g., above respective outdoor signal strength thresholds). The UE 510, being disposed in the building 533 as shown, may receive positioning signals of low strength, making determining a position of the UE 510 challenging, e.g., with long integration times used to measure signals adequately if adequate measurement is even possible. The UE 520, being disposed in an urban canyon, results in the satellite 190 being non-line-of-sight (NLOS) while the satellites 191-193 are line-of-sight (LOS). Consequently, for positioning signals 590 from the satellite 190 to be received by the UE 520 the positioning signals 590 are reflected while positioning signals 591, 592, 593 from the satellites 191-193 can reach the UE 520 directly. With a UE in a challenging environment such as indoors, in an urban canyon, inside a vehicle (e.g., a vehicle 540), in a covered region, etc., the UE may have difficulty measuring a sufficient number of positioning signals (e.g., cellular positioning signals and/or satellite positioning signals and/or other positioning signals) in order to determine a position estimate for the UE while meeting one or more criteria, e.g., position accuracy, latency, power consumption, etc. Challenges may include poor measurement quality, multiple NLOS measurements, weaker signals leading to poor observability, slow convergence after an initial first fix offset, etc. Strategies are discussed herein for determining UE position in challenging environments which may improve position accuracy, reduce latency, and/or quicken position convergence. The discussion herein focuses on reception and processing of satellite positioning signals, but the discussion is applicable to other types of positioning signals.

Figure 6:
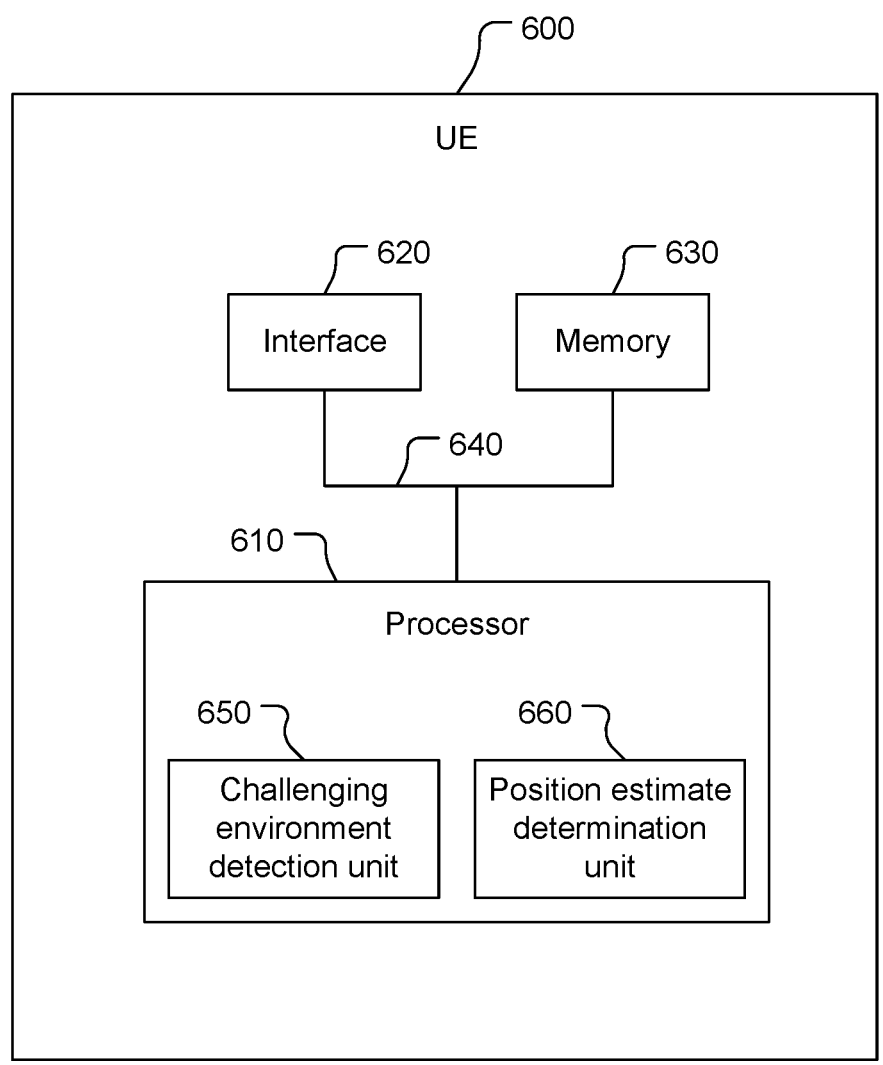
FIG. 6 is a simplified block diagram of an example user equipment.

Referring to FIG. 6, with further reference to FIGS. 1-5, a UE 600 includes a processor 610, an interface 620, and a memory 630 communicatively coupled to each other by a bus 640. The UE 600 may include some or all of the components shown in FIG. 5, and may include one or more other components such as any of those shown in FIG. 2 such that the UE 200 may be an example of the UE 600. The processor 610 may include one or more components of the processor 210. The interface 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 620 may include the wired transmitter 252 and/or the wired receiver 254. The interface 620 may include the SPS receiver 217 and the SPS antenna 262. The memory 630 may be configured similarly to the memory 211, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the interface 620) includes a challenging environment detection unit 650 and a position estimate determination unit 660. The challenging environment detection unit 650 may be configured to determine whether the UE 600 is in a challenging environment for determining position of the UE 600. The position estimate determination unit 660 may be configured to determine a position estimate of the UE 600, applying different techniques based on whether the UE 600 is in a challenging environment. Functionality of the challenging environment detection unit 650 and the position estimate determination unit 660 is discussed further below, and the description may refer to the processor 610 generally, or the UE 600 generally, as performing any of the functions of the challenging environment detection unit 650 and/or the position estimate determination unit 660.

Figure 7:
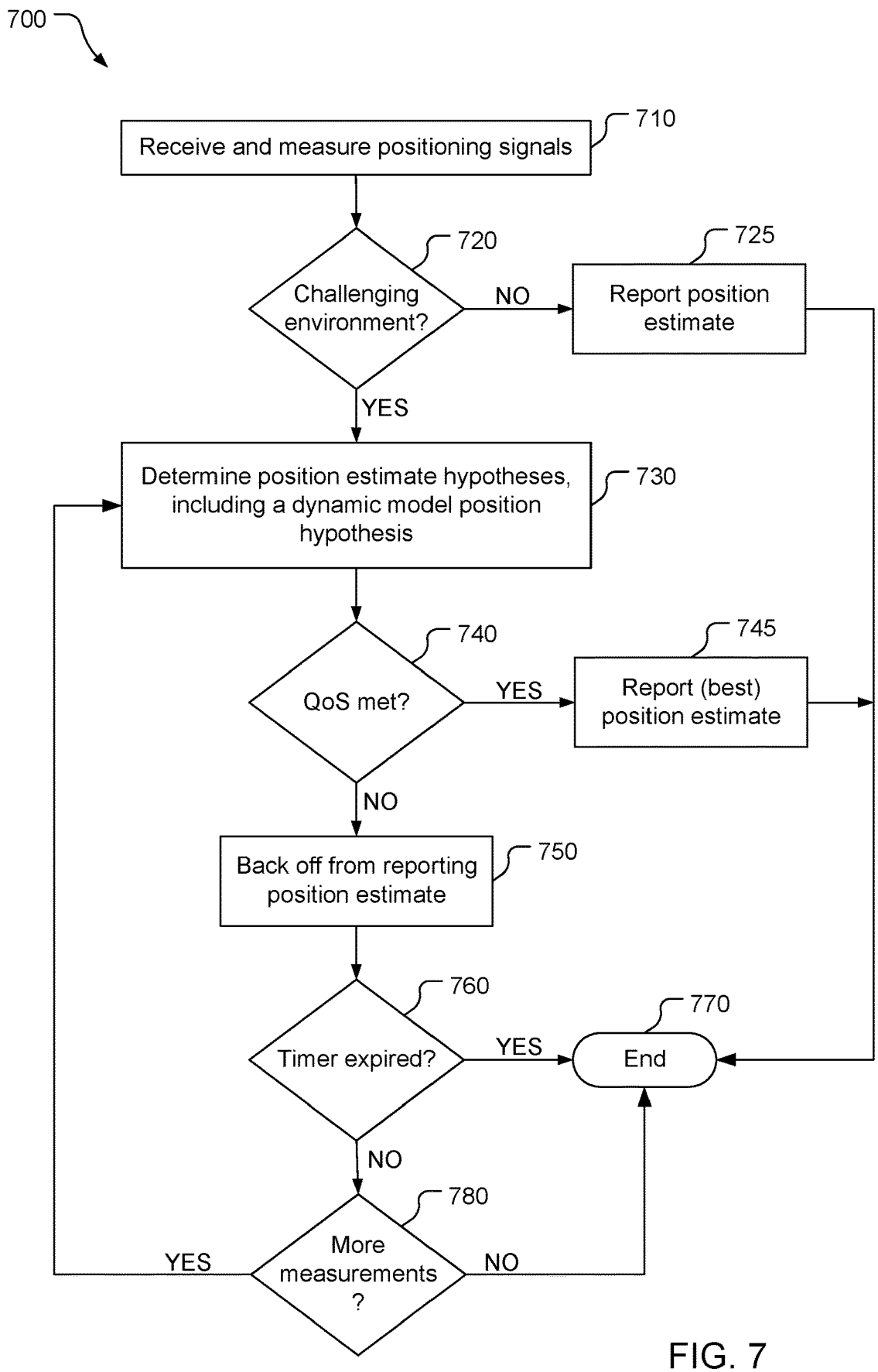
FIG. 7 is a block flow diagram of a positioning method.

Referring also to FIG. 7, a positioning method 700 includes the stages shown. The method 700 is, however, an example only and not limiting. The method 700 may be altered, e.g., by having stages added, removed, rearranged, combined, performed concurrently, and/or having single stages split into multiple stages.

At stage 710, positioning signals are received and measured. For example, satellite positioning signals are received via the interface 620 (e.g., the SPS antenna 262) and measured (e.g., by the SPS receiver 217 which may include a portion of the processor 610 such as a portion of the DSP 231). Also or alternatively, PRS (e.g., downlink PRS from one or more TRPs and/or sidelink PRS from one or more sidelink PRS sources such as other UEs) may be received and measured by the UE 600. The discussion herein may focus on satellite positioning signals as examples, but the discussion applies to positioning signals from positioning signal sources other than satellites. The positioning signals may be of sufficient quantity and strength for good position estimating, e.g., if the UE 600 is not in a challenging environment with open sky, or may be insufficient for doing so, e.g., if the UE 600 is in a challenging environment.

Figure 8:
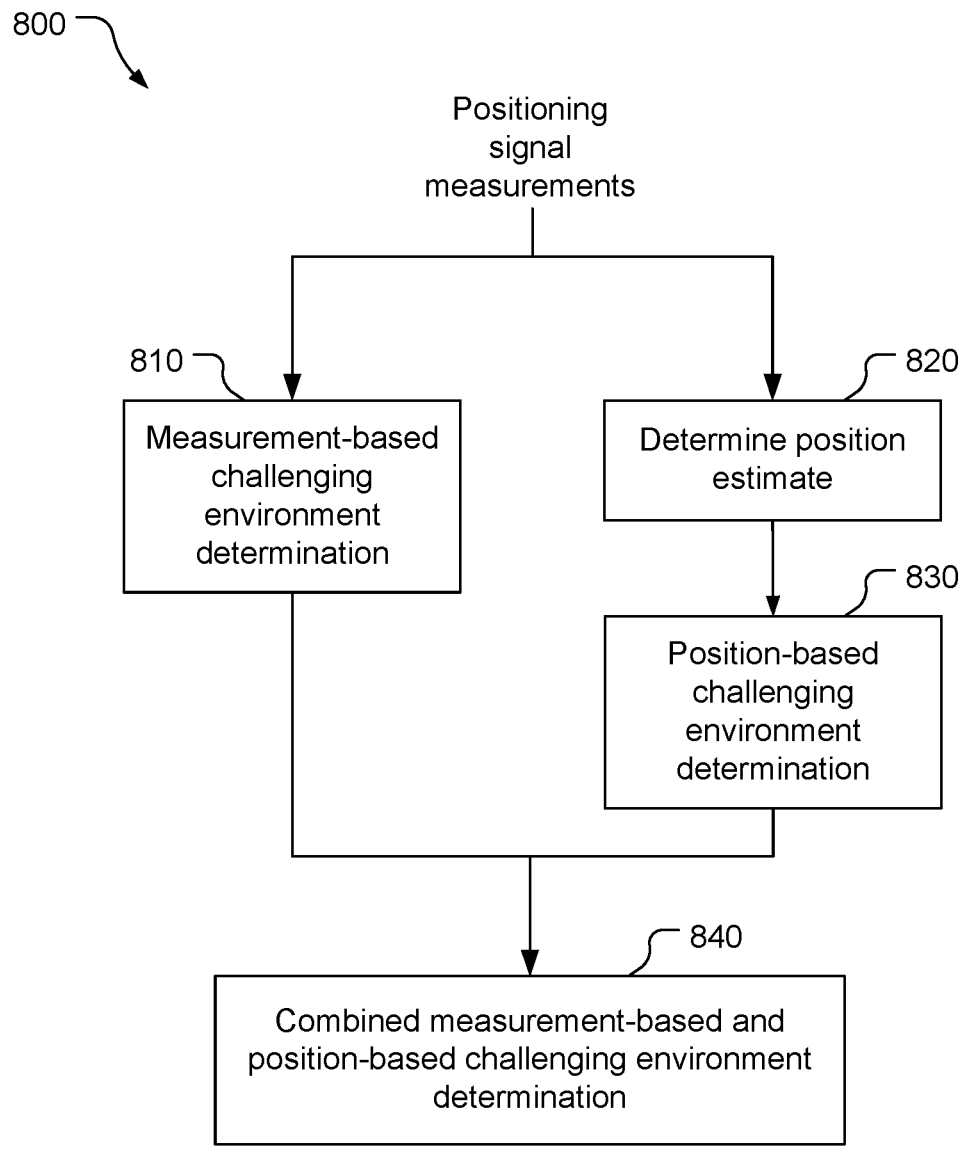
FIG. 8 is block flow diagram of a method for determining whether a user equipment is in a challenging environment.

At stage 720, the UE 600 determines whether the UE 600 is in a challenging environment. Referring also to FIG. 8, an example method 800 of stage 720 includes the stages shown. Other configurations may be used, including adding, removing, and/or rearranging stages. For example, stages 810 and 840 may be omitted for position-based challenging environment detection. As another example, stages 820, 830, 840 may be omitted for measurement-based challenging environment detection. At stage 810, the challenging environment detection unit 650 evaluates one or more positioning signal measurement metrics (e.g., CN0 (carrier-to-noise density), dwell time, frame sync status, bit sync status) to determine whether the UE 600 is in a challenging environment. For example, the challenging environment detection unit 650 may determine that the UE 600 is not in a challenging environment based on a threshold number of positioning signals having CN0 of at least a CN0-threshold level, having a dwell time less than a dwell-time threshold (e.g., 1 sec), and both frame sync and bit sync achieved in less than a threshold sync time, and determine that the UE 600 is in a challenging environment otherwise. Other techniques based on one or more of the measurement metrics (e.g., a combination or weighted combination of two or more of the measurement metrics) may be used to make the determination as to whether the UE 600 is in a challenging environment. At stage 820, the position estimate determination unit 660 uses the positioning signal measurements to determine a position estimate for the UE 600. At stage 830, the challenging environment detection unit 650 determines whether the determined position estimate meets one or more criteria. The one or more criteria may include a residual weighted sum squared error being below a threshold, a least-squared error below a threshold, a weighted least-squared error being below a threshold, an uncertainty being below a threshold, quantity of satellites corresponding to measured positioning signals (degrees of freedom) being above a threshold, an amount of redundant information available being above a threshold, or a combination (e.g., weighted combination) of two or more of any of these. If the one or more criteria are met (and thus the position estimate is of good quality), then the challenging environment detection unit 650 may conclude that the UE 600 is not in a challenging environment. If the one or more criteria are not met, then the challenging environment detection unit 650 may conclude that the UE 600 is in a challenging environment. At stage 840, the challenging environment detection unit 650 evaluates the determinations from stages 810 and 830 to determine the challenging environment status of the UE 600. If the determinations from stages 810 and 830 are the same, then the agreed-upon status is used. If the determinations from stages 810 and 830 are different, then the challenging environment detection unit 650 may, for example, perform further analysis (e.g., analyze one or more further measurement metrics and/or one or more further position estimate quality metrics, and/or change one or more of the measurement metric thresholds and/or one or of the position estimate quality metric thresholds and re-evaluate stage(s) 810 and/or 830). As another example, if the determinations from stages 810 and 830 are different, then the challenging environment detection unit 650 may conclude that the UE 600 is in a challenging environment. As another example, if the determinations from stages 810 and 830 are different, then the challenging environment detection unit 650 may use the position-based determination.

If the challenging environment detection unit 650 determines that the UE 600 is in a challenging environment, then the method 700 proceeds to stage 730, and proceeds to stage 725 if the challenging environment detection unit 650 determines that the UE 600 is not in a challenging environment. At stage 725, the processor 610 reports a position estimate based on the positioning signals measured at stage 710. If a position estimate was determined at stage 720, then this position estimate is reported. If a position estimate was not determined at stage 720, then the position estimate determination unit 660 determines a position estimate at stage 725. The processor 610 may report the position estimate internally to the UE 600, e.g., for use by an application, and/or may report the position estimate externally via the interface 620, e.g., to the server 400, such as an LMF, for use by the server 400 and/or for forwarding to a location services client. By determining that the UE 600 is in a challenging environment and applying, in response to this determination, one or more techniques discussed herein, a better position estimate may be determined and/or selected for reporting than reported otherwise.

Figure 9:
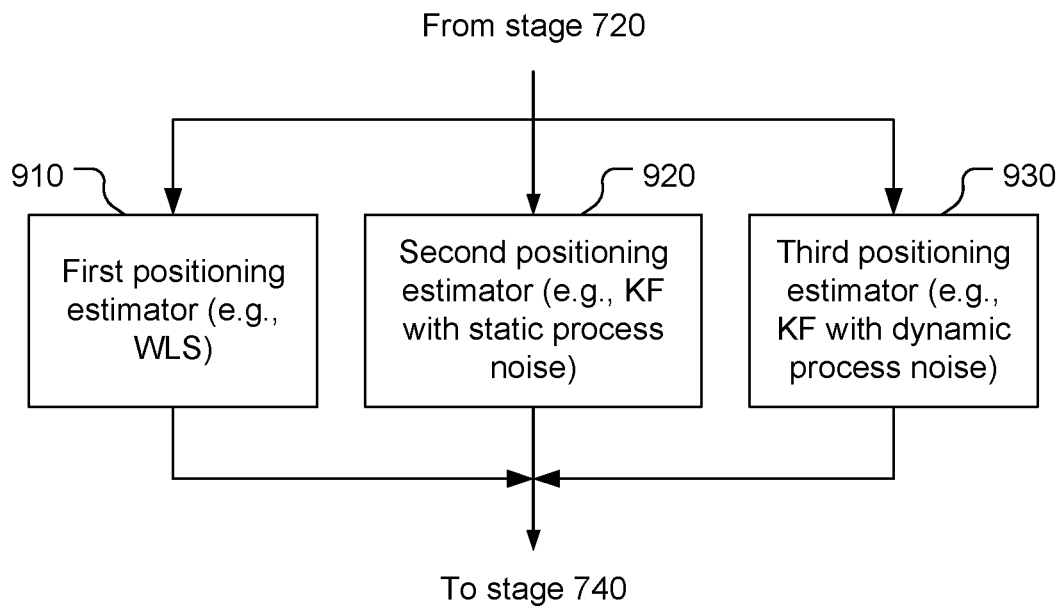
FIG. 9 is a block diagram of an example method of determining position estimate hypotheses.

At stage 730, the position estimate determination unit 660 determines position estimate hypotheses. The position estimate determination unit 660 may determine position estimate hypotheses using different techniques. One or more of the position estimate hypotheses may be determined regardless of the challenging environment determination at stage 720, or may be determined in response to the determination at stage 720 that the UE 600 is in a challenging environment. Referring also to FIG. 9, an example of stage 730 may include sub-stages 910, 920, 930, although one or more of the sub-stages may be omitted and/or one or more other sub-stages (e.g., for one or more other position estimating techniques and/or models) included. The position estimate determination unit 660 may determine a position estimate using a weighted least-squares (WLS) technique at sub-stage 910, may determine another position estimate at sub-stage 920 using a Kalman Filter with constant process noise, and may determine another position estimate at sub-stage 930 using a Kalman Filter with dynamic (adaptive) process noise. For a Kalman Filter (KF) with constant process noise, the position estimate determination unit 660 may restore the state of the KF to a default state or another state (e.g., the last state of the KF before the determination that the UE 600 is in a challenging environment) and apply the positioning signal measurements to the restored KF.

For a KF with dynamic process noise, the position estimate determination unit 660 may determine the dynamic process noise based on, for example, fix uncertainty, user motion, environment context detection, user dynamics, offset of a present position with respect to a previously-determined position (e.g., from a previous position session), etc. The environment context is the surroundings of the UE 600, e.g., being indoors, outdoors, near a building, under foliage, on a hiking trails, etc., and is useful in determining process noise. User dynamics is a characterization of dynamic motion of the UE 600. For example, user dynamics may be characterized as high when the UE 600 is being held in a hand of a user that is jogging, characterized as medium if the UE 600 is retained against an upper arm of a user that is jogging, and characterized as low when the UE 600 is stationary. User motion may be determined in accordance with categories such as vehicular motion, biking, pedestrian running, pedestrian walking, etc. The position estimate determination unit 660 may use the dynamic process noise to determine a covariance for the KF and apply the positioning measurements to the KF with the covariance based on the dynamic process noise. For example, if a previous UE position is known from a previous positioning session before the UE 600 is turned off (e.g., from 20 seconds ago), and a WLS fix determined from available measurements at a present epoch reveals that the present position is close to the previous position, then the KF may apply zero process noise in propagating the covariance. This may help the KF to isolate NLOS GNSS measurements. The constant-process-noise KF and the dynamic-process-noise KF may both use the same initial KF state, with the different KFs using different covariance models.

Figure 10:
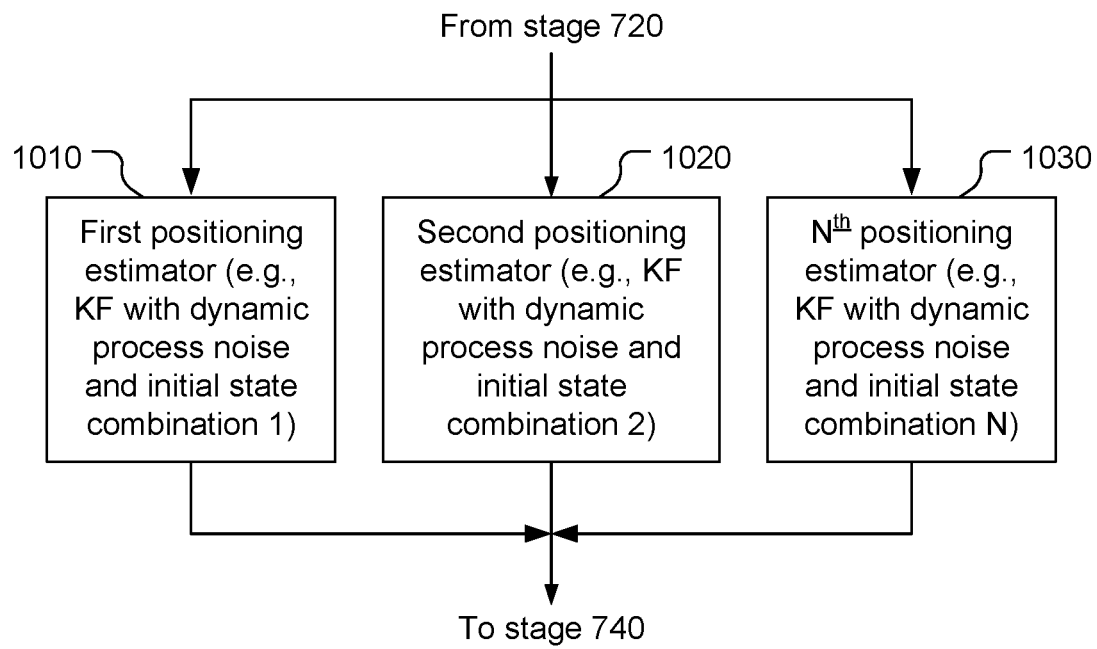
FIG. 10 is a block diagram of another example method of determining position estimate hypotheses.

Referring also to FIG. 10, another example of stage 730 may include sub-stages 1010, 1020, 1030, although one or more of the sub-stages may be omitted and/or one or more other sub-stages (e.g., for one or more other position estimating techniques (e.g., WLS) and/or models) included. In this example, the sub-stages 1010, 1020, 1030 represent N dynamic positioning estimator models. Each positioning estimator model is unique relative to the other dynamic positioning estimator models. For example, as indicated in FIG. 10, the position estimate determination unit 660 may evaluate a Kalman Filter for each of sub-stages 1010, 1020, 1030, with each KF having a different combination of initial state and process noise model. Different KFs may have the same initial state and different process noise models, or different initial states and the same process noise model, or different initial states and different process noise models. The different combinations of initial state and process noise model will yield different covariance values in the different sub-stages, which will result in different position estimates being determined at each of the sub-stages 1010, 1020, 1030. An initial state of a KF (e.g., a seed position estimate, a clock bias, a clock frequency bias, a user velocity, etc.) may be determined or selected in a variety of ways, e.g., set to the state from a previous KF fix, or set to a previous KF fix propagated to a current epoch, or set to a WLS fix from the current epoch, etc. Different process noise models may correspond to different levels of UE motion, e.g., from zero UE motion to high UE motion (e.g., above a threshold speed and/or above a threshold frequency of direction change, etc.), different offsets relative to previously-determined position estimate hypotheses, different fix uncertainties, etc.

At stage 740, the position estimate determination unit 660 determines whether any position estimate determined at stage 730 meets one or more QoS criteria. If at least one determined position estimate meets the one or more QoS criteria, then the method 700 proceeds to stage 745, at which the position estimate determination unit 660 reports a position estimate. If more than one position estimate hypothesis determined at stage 730 meets the one or more QoS criteria, then the position estimate determination unit 660 selects one of position estimate hypotheses, e.g., the position estimate hypothesis that best meets the one or more QoS criteria, for reporting. An example implementation of stages 740, 745, 750 is discussed below with respect to FIG. 11. If no position estimate determined at stage 730 meets the one or more QoS criteria, then the method 700 proceeds to stage 750.

At stage 750, the processor 610 backs off from reporting any position estimate for the UE 600. At stage 760, the position estimate determination unit 660 determines whether a timer has expired. A value of the timer may be set by the processor 610 based on the environment type (whether the environment is challenging) and/or QoS setting for the position fix. For example, the processor 610 may set the timer value to be longer the more challenging the environment is and/or the more stringent the QoS setting is (e.g., the higher the accuracy requirement is). If the timer expires, then the method ends at stage 770. If the timer has not expired, then at stage 780 the position estimate determination unit 660 determines whether there are more positioning signal measurements available for use in determining a new position estimate. If there are no more positioning signal measurements available, then the method 700 ends at stage 770, and otherwise proceeds to stage 730. At stage 730, the position estimate determination unit 660 may propagate the covariance of any KF, e.g., using fixed process noise or by determining and using dynamic process noise to propagate the covariance as appropriate, and may determine one or more new position estimates, e.g., using different Kalman Filters and/or one or more other techniques (e.g., weighted least squares (WLS)).

Figure 11:
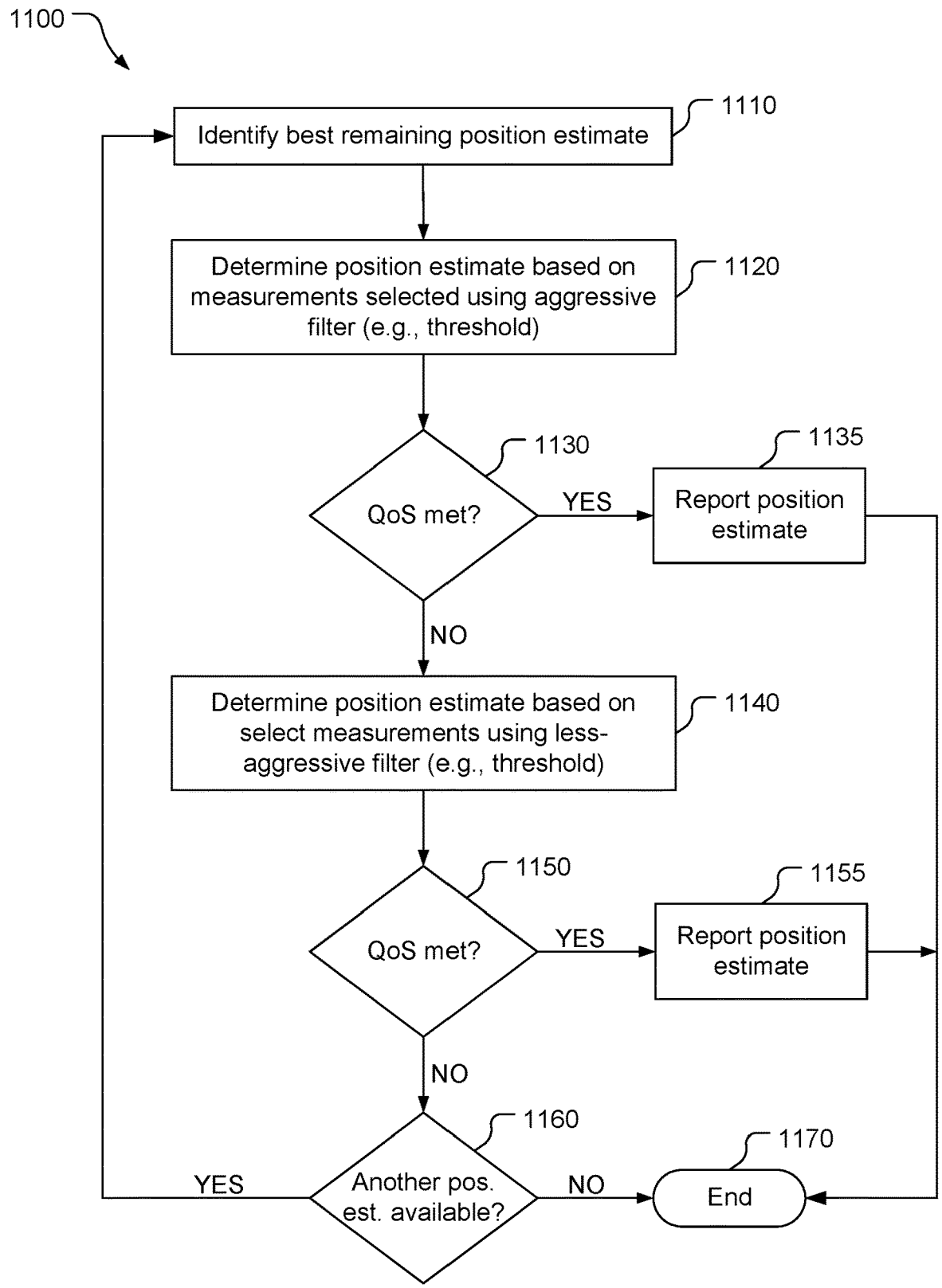
FIG. 11 is a block flow diagram of a position estimate reporting method.

Referring also to FIG. 11, a position estimate reporting method 1100 includes the stages shown. The method 1100 is, however, an example only and not limiting. The method 1100 may be altered, e.g., by stages added, removed, rearranged, combined, performed concurrently, and/or having single stages split into multiple stages. For example, in the method 1100, two levels of filters are applied to measurements, but a single filter may be applied, or more than two levels of filters may be applied. The method 1100 is an example of stage 745 for selecting the best position estimate hypothesis of multiple position estimate hypotheses and reporting the selected position estimate hypothesis.

At stage 1110, the position estimate determination unit 660 identifies the best remaining position estimate hypothesis. For example, if there is any position estimate hypothesis, e.g., determined at stage 730, that has not yet been evaluated for reporting according to the method 1100, then the best hypothesis is identified. If there is a single such hypothesis, then that hypothesis is identified as the best remaining hypothesis. If there is more than one remaining hypothesis, then one of the hypotheses is identified as the best of the hypotheses, e.g., based on position uncertainty, weighted sum square analysis, and/or unit fault (unit variance) analysis. For example, the best position estimate hypothesis may be the hypothesis corresponding to the Kalman Filter whose state is best fit by the measurements. That is, pseudorange residuals for corresponding positioning signal measurements will be small for the best position estimate hypothesis. For example, if measurements fit a KF well, then the unit fault will be small (where the unit fault is the sum of the residuals over the expected uncertainty, divided by the degrees of freedom). Thus, the position estimate determination unit 660 may identify the position estimate hypothesis corresponding to the lowest unit variance as the best position estimate hypothesis.

At stage 1120, the position estimate determination unit 660 determines a position estimate for the UE 600 based on one or more measurements selected using an aggressive filter. The position estimate determination unit 660 applies an aggressive filter (e.g., a high threshold value or a combination of threshold measurement values) selected to help ensure that a measurement that satisfies the filter is of an LOS signal and of high quality. The filter will eliminate outlier measurements from being used to determine a new position estimate. The position estimate determination unit 660 applies the aggressive filter to measurements that yielded the best remaining position estimate hypothesis identified at stage 1110. The position estimate determination unit 660 determines a new position estimate using the measurement(s) that satisfy the aggressive filter. As there may be fewer measurements used to determine the new position estimate compared to the position estimate hypothesis, the new position estimate may be different from the position estimate hypothesis.

At stage 1130, the processor 610 determines whether the new position estimate determined at stage 1120 satisfies one or more QoS criteria. If the new position estimate meets the QoS, then the method 1100 proceeds to stage 1135 where, similar to stage 735, the new position estimate is reported as the position of the UE 600. By removing outlier measurements from consideration in determining the position estimate, a more accurate position estimate may be determined. If the new position estimate fails to meet the QoS (e.g., does not satisfy one or more QoS criteria), then the method 1100 proceeds to stage 1140.

At stage 1140, the position estimate determination unit 660 determines a position estimate for the UE 600 based on one or more measurements selected using another filter that is less aggressive than the aggressive filter applied at stage 1120. The less-aggressive filter may, for example, have a lower threshold value than the aggressive filter or may have a combination of threshold measurement values that is easier to meet than a combination of threshold measurement values of the aggressive filter. The position estimate determination unit 660 applies the less-aggressive filter to the measurements that yielded the best remaining position estimate hypothesis identified at stage 1110. The position estimate determination unit 660 determines a new position estimate using the measurement(s) that satisfy the less-aggressive filter.

At stage 1150, the processor 610 determines whether the new position estimate determined at stage 1140 satisfies one or more QoS criteria. The QoS criteria used at stage 1150 may be the same QoS criteria used at stage 1130. If the new position estimate meets the QoS, then the method 1100 proceeds to stage 1155 where, similar to stage 735, the new position estimate is reported as the position of the UE 600. If the new position estimate fails to meet the QoS (e.g., does not satisfy one or more QoS criteria), then the method 1100 proceeds to stage 1160.

At stage 1160, the processor 610 determines whether there is any further position estimate hypothesis remaining to be evaluated. If there is no further position estimate hypothesis yet to be evaluated, then the method 1100 ends at stage 1170. If there is at least one position estimate hypothesis yet to be evaluated, then the method 1100 returns to stage 1110 where the best remaining hypothesis (next best relative to the hypothesis just evaluated) is identified.

Figure 12:
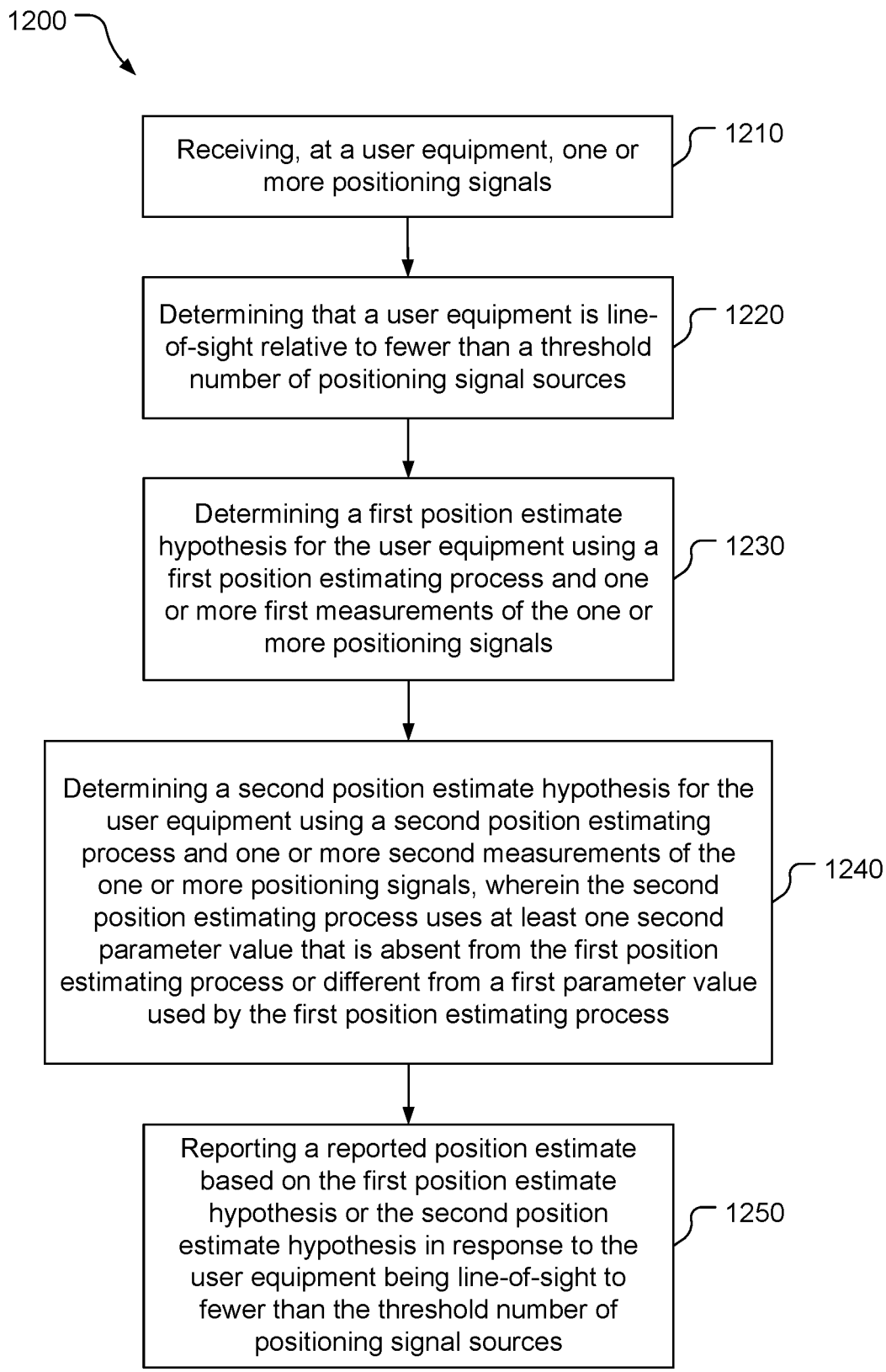
FIG. 12 is a block flow diagram of a positioning method.

Referring to FIG. 12, with further reference to FIGS. 1-11, a position estimate reporting method 1200 includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes receiving, at a user equipment, one or more positioning signals. For example, the processor 610 receives one or more satellite positioning signals via the interface 620 (e.g., the SPS antenna 262 and the SPS receiver 217) from one or more of the satellites 190-193 and/or one or more PRS from one or more TRPs 300 and/or PRS from one or more UEs via the interface 620 (e.g., the antenna 246 and the wireless receiver 244). The processor 610, possibly in combination with the memory 630, and the interface 620 (e.g., the SPS antenna 262 and the SPS receiver 217, and/or the antenna 246 and the wireless receiver 244) may comprise means for receiving one or more positioning signals.

At stage 1220, the method 1200 includes determining that the user equipment is line-of-sight relative to fewer than a threshold number of positioning signal sources. For example, the challenging environment detection unit 650 may analyze one or more position estimates and/or one or more positioning signal measurements to determine that the UE 600 is LOS with fewer than a threshold number of satellites (and/or TRPs and/or UEs) that will enable the position estimate determination unit 660 to determine a position of the UE 600 that will meet a desired QoS, e.g., one or more QoS criteria. The processor 610, possibly in combination with the memory 630, may comprise means for determining that the user equipment is LOS relative to fewer than the threshold number of positioning signal sources.

At stage 1230, the method 1200 includes determining a first position estimate hypothesis for the user equipment using a first position estimating process and one or more first measurements of the one or more positioning signals. For example, the position estimate determination unit 660 may determine a position estimate using one or more positioning signal measurements using WLS, or using a Kalman Filter without including process noise, or using a Kalman Filter with static process noise, or using a Kalman Filter using dynamic process noise, or using another technique. The processor 610, possibly in combination with the memory 630, may comprise means for determining the first position estimate hypothesis.

At stage 1240, the method 1200 includes determining a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value. For example, the position estimate determination unit 660 may determine a position estimate using one or more positioning signal measurements using WLS, or using a Kalman Filter with static process noise, or using a Kalman Filter using dynamic process noise, or using another technique. For example, the first and second position estimate hypotheses may be determined using a Kalman Filter with the same initial state and with different covariance models (e.g., one determined using fixed process noise and the other determined using dynamic process noise). As another example, the first and second position estimate hypotheses may be determined using a Kalman Filter with different initial states and with the same covariance models or different covariance models. As another example, the position estimate determination unit 660 may determine the first position estimate using WLS (or other non-Kalman Filter technique) and determine the second position estimate using a Kalman Filter that will use one or more parameters (e.g., initial state parameter(s) and/or covariance parameter(s)) not used in determining the first position estimate. The first measurement(s) and the second measurement(s) may be made using the same positioning signal(s), using different positioning signal(s), or using at least one shared positioning signal and at least one different positioning signal. The processor 610, possibly in combination with the memory 630, may comprise means for determining the second position estimate hypothesis.

At stage 1250, the method 1200 includes reporting a reported position estimate based on the first position estimate hypothesis or the second position estimate hypothesis in response to the user equipment being line-of-sight to fewer than the threshold number of positioning signal sources. For example, the first and second position estimates may be determined in response to determining that the UE 600 is in a challenging environment, and a position estimate based on the first or second position estimate hypothesis (e.g., the first or second hypothesis, or another hypothesis determined using one or more measurements used to determine the first or second hypothesis (e.g., as discussed with respect to FIG. 11)). The reported position estimate may be reported internally to the UE 600 (e.g., to an application) and/or to an external entity via the interface 620. The processor 610, possibly in combination with the memory 630, possibly in combination with the interface 620 (e.g., the wireless transmitter 242 and the antenna 246) may comprise means for reporting the reported position estimate.

Implementations of the method 1200 may include one or more of the following features. In an example implementation, the method 1200 includes: determining a third position estimate hypothesis for the user equipment using a third position estimating process that uses a third parameter value; determining the second parameter value by applying process noise relative to the first position estimating process; and determining the third parameter value by applying the process noise relative to the second position estimating process. For example, the first position estimate may be determined by using a Kalman filter (first Kalman Filter) with a first covariance matrix determined with or without process noise, the second position estimate determined by applying fixed process noise to the first Kalman Filter to determine a second Kalman Filter (e.g., a second covariance matrix for the Kalman Filter) and using the second Kalman Filter to determine the second position estimate, and the third position estimate determined by applying the fixed process noise to the second Kalman Filter to determine a third Kalman Filter (e.g., a third covariance matrix for the Kalman Filter) and using the third Kalman Filter to determine the third position estimate. The processor 610, possibly in combination with the memory 630, may comprise means for determining the third position estimate hypothesis, means for determining the second parameter, and means for determining the third parameter. In another example implementation, the second parameter value comprises an initial position estimate of the user equipment. For example, the position estimate determination unit 660 may determine the second position estimate using a Kalman Filter with an initial position estimate as a seed position estimate and determine the first position estimate using a non-Kalman Filter technique, or using a Kalman Filter without using an initial position estimate, or using a Kalman Filter with a different initial position estimate.

Also or alternatively, implementations of the method 1200 may include one or more of the following features. In an example implementation, the method 1200 includes: determining dynamic process noise; and determining the second parameter value based on the dynamic process noise. For example, the position estimate determination unit 660 may determine (e.g., at any of sub-stages 930, 1010, 1020, 1030) dynamic process noise, use the dynamic process noise to determine a covariance matrix (including the second parameter value) of a Kalman Filter, and use the Kalman Filter to determine the second position estimate. The processor 610, possibly in combination with the memory 630, may comprise means for determining the dynamic process noise and means for determining the second parameter based on the dynamic process noise. In a further example implementation, the dynamic process noise is determined based on at least one of an uncertainty of a position fix for the user equipment, motion of the user equipment, environment context, user dynamics, or position offset with respect to a previously-determined position of the user equipment. In another further example implementation, the dynamic process noise is second dynamic process noise, and the positioning method 1200 further comprises: determining first dynamic process noise; and determining the first parameter value based on the first dynamic process noise. For example, the position estimate determination unit 660 may determine the first position estimate at sub-stage 1010 using first dynamic noise and determine the second position estimate at sub-stage 1020 using second dynamic noise. The processor 610, possibly in combination with the memory 630, may comprise means for determining the first dynamic process noise and means for determining the first parameter value based on the first dynamic process noise.

Also or alternatively, implementations of the method 1200 may include one or more of the following features. In an example implementation, the first position estimate hypothesis is determined using a first dynamic model with a first combination of first position seed value and first process noise and the second position estimate hypothesis is determined using a second dynamic model with a second combination of second position seed value and second process noise that is different from the first combination of first position seed value and first process noise. For example, at sub-stage 1010 the position estimate determination unit 660 may determine the first position estimate using a first initial state and first dynamic noise and at sub-stage 1010 the position estimate determination unit 660 may determine the second position estimate using a second initial state and second dynamic noise, where the first initial state is different from the second initial state and/or the first dynamic noise is different from the second dynamic noise. In a further example implementation, the method 1200 includes determining a candidate position estimate based on measurements that correspond to a highest-quality position estimate hypothesis, of the first position estimate hypothesis and the second position estimate hypothesis, and that meet at least one first measurement criterion; and selecting the candidate position estimate as the reported position estimate in response to the candidate position estimate satisfying at least one quality of service criterion. For example, as discussed with respect to stage 1120, measurements corresponding to a best position estimate hypothesis may be filtered and the measurements remaining after the filtering may be used to determine a candidate position estimate that is selected for reporting if the candidate position estimate meets a desired quality of service (e.g., one or more QoS metrics). This may improve position estimate quality (e.g., accuracy) by avoiding reporting a position estimate determined using one or more outlier measurements. The processor 610, possibly in combination with the memory 630, may comprise means for determining the candidate position estimate and means for selecting the candidate position estimate as the reported position estimate. In another further example implementation, the method 1200 includes: determining a first candidate position estimate based on measurements that correspond to a highest-quality position estimate hypothesis, of the first position estimate hypothesis and the second position estimate hypothesis, and that meet at least one first measurement criterion; determining, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and selecting the second candidate position estimate as the reported position estimate in response to the second candidate position estimate satisfying the at least one quality of service criterion. For example, as discussed with respect to stages 1130, 1140, 1150, 1155, if a first candidate position estimate determined based on aggressively-filtered measurements of a best available position estimate hypothesis fails to meet desired quality of service, then a second candidate position estimate may be determined based on less-aggressively-filtered measurements of the best available position estimate hypothesis, and the second candidate position estimate reported if the second candidate position estimate satisfies the desired quality of service. The processor 610, possibly in combination with the memory 630, may comprise means for determining the first candidate position estimate, means for determining the second candidate position estimate, and means for selecting the second candidate position estimate as the reported position estimate.

Also or alternatively, implementations of the method 1200 may include one or more of the following features. In an example implementation, the user equipment is determined to be line-of-sight to fewer than the threshold number of positioning signal sources based on one or more reference position estimates for the user equipment. For example, at stage 830, the challenging environment detection unit 650 determines that the UE 600 is LOS to fewer than the threshold number of positioning signal sources by analyzing one or more position estimates for the UE 600. In a further example implementation, the user equipment is determined to be line-of-sight to fewer than the threshold number of positioning signal sources based further on one or more third measurements of the one or more positioning signals. For example, at stage 810, the challenging environment detection unit 650 determines that the UE 600 is LOS to fewer than the threshold number of positioning signal sources by analyzing one or more positioning signal measurements and at stage 840 the challenging environment detection unit 650 determines that the UE 600 is LOS to fewer than the threshold number of positioning signal sources by analyzing the determinations from stages 810, 830. The third measurement(s) may be made using one or more of the one or more positioning signals used for the first measurement(s) and/or the second measurement(s), or may be made using one or more different positioning signal(s), or may be made using at least one shared positioning signal (used for at least one first measurement or at least one second measurement) and at least one different positioning signal. The processor 610, possibly in combination with the memory 630, and the interface 620 (e.g., the SPS antenna 262 and the SPS receiver 217, and/or the antenna 246 and the wireless receiver 244) may comprise means for determining the user equipment to be line-of-sight to fewer than the threshold number of positioning signal sources corresponding to the positioning signals based further on one or more measurements of the positioning signals. The challenging environment detection unit 650 may, under different circumstances than for the method 1200, determine that the user equipment is line-of-sight to at least the threshold number of positioning signal sources in response to the one or more measurements of the positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources. For example, at stage 840 the challenging environment detection unit 650 may conclude that the UE 600 is not in a challenging environment based on the measurement analysis at stage 810 indicating that the UE 600 is in a challenging environment and the position estimate analysis at stage 830 indicating that the UE 600 is not in a challenging environment.

Figure 13:
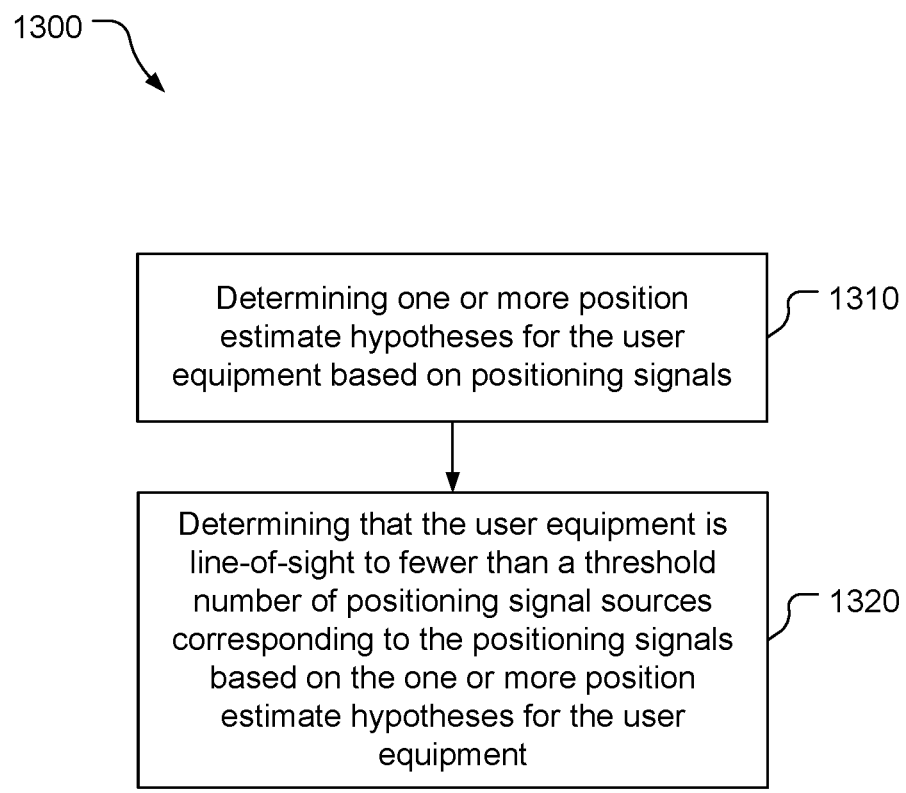
FIG. 13 is a block flow diagram of a method at a user equipment.

Referring to FIG. 13, with further reference to FIGS. 1-11, a method 1300 at a user equipment includes the stages shown. The method 1300 is, however, an example only and not limiting. The method 1300 may be altered, e.g., by having stages added, removed, rearranged, combined, performed concurrently, and/or having single stages split into multiple stages.

At stage 1310, the method 1300 includes determining one or more position estimate hypotheses for the user equipment based on positioning signals. For example, at stage 820, the position estimate determination unit 660 determines one or more position estimates for the UE 600 using one or more received positioning signals. The processor 610, possibly in combination with the memory 630, and the interface 620 (e.g., the SPS antenna 262 and the SPS receiver 217, and/or the antenna 246 and the wireless receiver 244) may comprise means for determining the one or more position estimate hypotheses.

At stage 1320, the method 1300 includes determining that the user equipment is line-of-sight to fewer than a threshold number of positioning signal sources corresponding to the positioning signals based on the one or more position estimate hypotheses for the user equipment. For example, at stage 830, the challenging environment detection unit 650 analyzes the one or more position estimate hypotheses to determine whether the UE 600 is LOS with fewer than a threshold number of positioning signal sources (e.g., satellites, TRPs, UEs) that will enable the position estimate determination unit 660 to determine a position of the UE 600 that will meet a desired QoS, e.g., one or more QoS criteria. The processor 610, possibly in combination with the memory 630, may comprise means for determining that the user equipment is LOS to fewer than the threshold number of positioning signal sources.

Implementations of the method 1300 may include one or more of the following features. In an example implementation, determining that the user equipment is line-of-sight to fewer than the threshold number of positioning signal sources comprises determine that a residual weighted sum squared error is above a first error threshold, or that a least-squared error is above a second error threshold, or that a weighted least-squared error is above a third error threshold, or that an uncertainty is above an uncertainty threshold, or that a quantity of positioning signal sources corresponding to the positioning signals is below a positioning signal source quantity threshold, or a combination of two or more thereof. For example, the challenging environment detection unit 650 analyzes the one or more position estimate hypotheses to determine one or more of such measurements and compares each of the measurements to a respective threshold. The challenging environment detection unit 650 may use a combination of the measurements relative to the thresholds to determine whether the UE 600 is in a challenging environment. For example, the challenging environment detection unit 650 may determine that the UE 600 is in a challenging environment based on two or more measurements relative to respective thresholds indicating a challenging environment in response to one measurement relative to a respective threshold indicating a non-challenging environment. In another example implementation, the user equipment is determined to be line-of-sight to fewer than the threshold number of positioning signal sources corresponding to the positioning signals based further on one or more measurements of the positioning signals. For example, at stage 810, the challenging environment detection unit 650 determines that the UE 600 is LOS to fewer than the threshold number of positioning signal sources by analyzing one or more positioning signal measurements and at stage 840 the challenging environment detection unit 650 determines that the UE 600 is LOS to fewer than the threshold number of positioning signal sources by analyzing the determinations from stages 810, 830. The processor 610, possibly in combination with the memory 630, and the interface 620 (e.g., the SPS antenna 262 and the SPS receiver 217, and/or the antenna 246 and the wireless receiver 244) may comprise means for determining the user equipment to be line-of-sight to fewer than the threshold number of positioning signal sources corresponding to the positioning signals based further on one or more measurements of the positioning signals. The challenging environment detection unit 650 may, under different circumstances than for the method 1300, determine that the user equipment is line-of-sight to at least the threshold number of positioning signal sources in response to the one or more measurements of the positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources.

Also or alternatively, implementations of the method 1300 may include one or more of the following features. In an example implementation, determining the one or more position estimate hypotheses comprises: determining a first position estimate hypothesis for the user equipment using a first position estimating process and one or more first measurements of one or more of the positioning signals; and determining a second position estimate hypothesis for the user equipment using a second position estimating process and one or more second measurements of one or more of the positioning signals, wherein the second position estimating process uses at least one second parameter value that is absent from the first position estimating process or different from a first parameter value used by the first position estimating process; and the method 1300 further comprises reporting a reported position estimate based on the first position estimate hypothesis or the second position estimate hypothesis in response to the user equipment being line-of-sight to fewer than the threshold number of positioning signal sources. For example, as discussed with respect to stages 1230, 1240, 1250, the UE 600 may determine a second position estimate hypothesis using a second parameter value of a parameter either not used to determine a first position estimate hypothesis or used but with a first parameter value that is different than the second parameter value, and a position estimate based on the first or second position estimate hypothesis may be reported (internally and/or externally to the UE 600).

Implementation Examples

Implementation examples are provided in the following numbered clauses.

1. A user equipment comprising:
   a receiver configured to receive one or more positioning signals;
   a memory; and
   a processor, communicatively coupled to the receiver and the memory, configured to:
   determine that the user equipment is line-of-sight relative to fewer than a threshold number of positioning signal sources;
   determine a first position estimate hypothesis for the user equipment using a first position estimating process and one or more first measurements of the one or more positioning signals;
   determine a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and
   report a reported position estimate based on the first position estimate hypothesis or the second position estimate hypothesis in response to the user equipment being line-of-sight to fewer than the threshold number of positioning signal sources.

2. The user equipment of claim 1, wherein the processor is further configured to:
   determine a third position estimate hypothesis for the user equipment using a third position estimating process that uses a third parameter value;
   determine the second parameter value by applying process noise relative to the first position estimating process; and
   determine the third parameter value by applying the process noise relative to the second position estimating process.

3. The user equipment of claim 1, wherein the second parameter value comprises an initial position estimate of the user equipment.

4. The user equipment of claim 1, wherein the processor is further configured to:
   determine dynamic process noise; and
   determine the second parameter value based on the dynamic process noise.

5. The user equipment of claim 4, wherein the processor configured to determine the dynamic process noise comprises the processor further configured to determine the dynamic process noise based on at least one of an uncertainty of a position fix for the user equipment, motion of the user equipment, environment context, user dynamics, or position offset with respect to a previously-determined position of the user equipment.

6. The user equipment of claim 4, wherein the dynamic process noise is second dynamic process noise, and wherein the processor is further configured to:
   determine first dynamic process noise; and
   determine the first parameter value based on the first dynamic process noise.

7. The user equipment of claim 1, wherein the processor is further configured to determine the first position estimate hypothesis using a first dynamic model with a first combination of first position seed value and first process noise and to determine the second position estimate hypothesis using a second dynamic model with a second combination of second position seed value and second process noise that is different from the first combination of the first position seed value and the first process noise.

8. The user equipment of claim 7, wherein the processor is further configured to:
   determine a candidate position estimate based on measurements that correspond to a highest-quality position estimate hypothesis, of the first position estimate hypothesis and the second position estimate hypothesis, and that meet at least one first measurement criterion; and
   select the candidate position estimate as the reported position estimate in response to the candidate position estimate satisfying at least one quality of service criterion.

9. The user equipment of claim 7, wherein the processor is further configured to:
   determine a first candidate position estimate based on measurements that correspond to a highest-quality position estimate hypothesis, of the first position estimate hypothesis and the second position estimate hypothesis, and that meet at least one first measurement criterion;
   determine, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and select the second candidate position estimate as the reported position estimate in response to the second candidate position estimate satisfying the at least one quality of service criterion.

10. The user equipment of claim 1, wherein the processor is further configured to determine that the user equipment is line-of-sight to fewer than the threshold number of positioning signal sources based on one or more reference position estimates for the user equipment.

11. The user equipment of claim 10, wherein the processor is further configured to determine that the user equipment is line-of-sight to fewer than the threshold number of positioning signal sources based further on one or more third measurements of the one or more positioning signals.

12. The user equipment of claim 11, wherein the processor is further configured to determine that the user equipment is line-of-sight to at least the threshold number of positioning signal sources in response to the one or more third measurements of the one or more positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources.

13. A position estimate reporting method comprising:

receiving, at a user equipment, one or more positioning signals;

determining that the user equipment is line-of-sight relative to fewer than a threshold number of positioning signal sources;

determining a first position estimate hypothesis for the user equipment using a first position estimating process and one or more first measurements of the one or more positioning signals;

determining a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and reporting a reported position estimate based on the first position estimate hypothesis or the second position estimate hypothesis in response to the user equipment being line-of-sight to fewer than the threshold number of positioning signal sources.

14. The position estimate reporting method of claim 13, further comprising:

determining a third position estimate hypothesis for the user equipment using a third position estimating process that uses a third parameter value;

determining the second parameter value by applying process noise relative to the first position estimating process; and determining the third parameter value by applying the process noise relative to the second position estimating process.

15. The position estimate reporting method of claim 13, wherein the second parameter value comprises an initial position estimate of the user equipment.

16. The position estimate reporting method of claim 13, further comprising:

determining dynamic process noise; and determining the second parameter value based on the dynamic process noise.

17. The position estimate reporting method of claim 16, wherein the dynamic process noise is determined based on at least one of an uncertainty of a position fix for the user equipment, motion of the user equipment, environment context, user dynamics, or position offset with respect to a previously-determined position of the user equipment.

18. The position estimate reporting method of claim 16, wherein the dynamic process noise is second dynamic process noise, and the position estimate reporting method further comprises:

determining first dynamic process noise; and determining the first parameter value based on the first dynamic process noise.

19. The position estimate reporting method of claim 13, wherein the first position estimate hypothesis is determined using a first dynamic model with a first combination of first position seed value and first process noise and the second position estimate hypothesis is determined using a second dynamic model with a second combination of second position seed value and second process noise that is different from the first combination of the first position seed value and the first process noise.

20. The position estimate reporting method of claim 19, further comprising:

determining a candidate position estimate based on measurements that correspond to a highest-quality position estimate hypothesis, of the first position estimate hypothesis and the second position estimate hypothesis, and that meet at least one first measurement criterion; and selecting the candidate position estimate as the reported position estimate in response to the candidate position estimate satisfying at least one quality of service criterion.

21. The position estimate reporting method of claim 19, further comprising:

determining a first candidate position estimate based on measurements that correspond to a highest-quality position estimate hypothesis, of the first position estimate hypothesis and the second position estimate hypothesis, and that meet at least one first measurement criterion;

determining, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and selecting the second candidate position estimate as the reported position estimate in response to the second candidate position estimate satisfying the at least one quality of service criterion.

22. The position estimate reporting method of claim 13, wherein the user equipment is determined to be lineof-sight to fewer than the threshold number of positioning signal sources based on one or more reference position estimates for the user equipment.

23. The position estimate reporting method of claim 22, wherein the user equipment is determined to be line-of-sight to fewer than the threshold number of positioning signal sources based further on one or more third measurements of the one or more positioning signals.

24. A user equipment comprising:
means for receiving one or more positioning signals;
means for determining that the user equipment is line-of-sight relative to fewer than a threshold number of positioning signal sources;
means for determining a first position estimate hypothesis for the user equipment using a first position estimating process and one or more first measurements of the one or more positioning signals;
means for determining a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and
means for reporting a reported position estimate based on the first position estimate hypothesis or the second position estimate hypothesis in response to the user equipment being line-of-sight to fewer than the threshold number of positioning signal sources.

25. The user equipment of claim 24, further comprising:
means for determining a third position estimate hypothesis for the user equipment using a third position estimating process that uses a third parameter value;
means for determining the second parameter value by applying process noise relative to the first position estimating process; and
means for determining the third parameter value by applying the process noise relative to the second position estimating process.

26. The user equipment of claim 24, wherein the second parameter value comprises an initial position estimate of the user equipment.

27. The user equipment of claim 24, further comprising:
means for determining dynamic process noise; and
means for determining the second parameter value based on the dynamic process noise.

28. The user equipment of claim 27, wherein the means for determining the dynamic process noise comprise means for determining the dynamic process noise based on at least one of an uncertainty of a position fix for the user equipment, motion of the user equipment, environment context, user dynamics, or position offset with respect to a previously-determined position of the user equipment.

29. The user equipment of claim 27, wherein the dynamic process noise is second dynamic process noise, and the user equipment further comprises:
means for determining first dynamic process noise; and
means for determining the first parameter value based on the first dynamic process noise.

30. The user equipment of claim 24, wherein the means for determining the first position estimate hypothesis comprise means for determining the first position estimate hypothesis using a first dynamic model with a first combination of first position seed value and first process noise, and the means for determining the second position estimate hypothesis comprise means for determining the second position estimate hypothesis using a second dynamic model with a second combination of second position seed value and second process noise that is different from the first combination of the first position seed value and the first process noise.

31. The user equipment of claim 30, further comprising:
means for determining a candidate position estimate based on measurements that correspond to a highest-quality position estimate hypothesis, of the first position estimate hypothesis and the second position estimate hypothesis, and that meet at least one first measurement criterion; and
means for selecting the candidate position estimate as the reported position estimate in response to the candidate position estimate satisfying at least one quality of service criterion.

32. The user equipment of claim 30, further comprising:
means for determining a first candidate position estimate based on measurements that correspond to a highest-quality position estimate hypothesis, of the first position estimate hypothesis and the second position estimate hypothesis, and that meet at least one first measurement criterion;
means for determining, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and
means for selecting the second candidate position estimate as the reported position estimate in response to the second candidate position estimate satisfying the at least one quality of service criterion.

33. The user equipment of claim 24, wherein the means for determining that the user equipment is line-of-sight to fewer than the threshold number of positioning signal sources comprise means for determining that the user equipment is line-of-sight to fewer than the threshold number of positioning signal sources based on one or more reference position estimates for the user equipment.

34. The user equipment of claim 33, wherein the means for determining that the user equipment is line-of-sight to fewer than the threshold number of positioning signal sources comprise means for determining that the user equipment is line-of-sight to fewer than the threshold number of positioning signal sources based further on one or more third measurements of the one or more positioning signals.

35. The user equipment of claim 34, further comprising means for determining that the user equipment is line-of-sight to at least the threshold number of positioning signal sources in response to the one or more third measurements of the one or more positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources.

36. A non-transitory, processor-readable storage medium comprising processor-readable instructions to cause a processor to:
determine that a user equipment is line-of-sight relative to fewer than a threshold number of positioning signal sources;
determine a first position estimate hypothesis for the user equipment using a first position estimating process and one or more first measurements of one or more positioning signals;
determine a second position estimate hypothesis for the user equipment using a second position estimating process and one or more second measurements of the one or more positioning signals, wherein the second position estimating process uses a second parameter value of a parameter and the parameter is absent from the first position estimating process or has a first parameter value that is different from the second parameter value; and
report a reported position estimate based on the first position estimate hypothesis or the second position estimate hypothesis in response to the user equipment being line-of-sight to fewer than the threshold number of positioning signal sources.

37. The storage medium of claim 36, further comprising processor-readable instructions to cause the processor to:
determine a third position estimate hypothesis for the user equipment using a third position estimating process that uses a third parameter value;
determine the second parameter value by applying process noise relative to the first position estimating process; and
determine the third parameter value by applying the process noise relative to the second position estimating process.

38. The storage medium of claim 36, wherein the second parameter value comprises an initial position estimate of the user equipment.

39. The storage medium of claim 36, further comprising processor-readable instructions to cause the processor to:
determine dynamic process noise; and
determine the second parameter value based on the dynamic process noise.

40. The storage medium of claim 39, wherein the processor-readable instructions to cause the processor to determine the dynamic process noise comprise processor-readable instructions to cause the processor to determine the dynamic process noise based on at least one of an uncertainty of a position fix for the user equipment, motion of the user equipment, environment context, user dynamics, or position offset with respect to a previously-determined position of the user equipment.

41. The storage medium of claim 39, wherein the dynamic process noise is second dynamic process noise, and the storage medium further comprises processor-readable instructions to cause the processor to:
determine first dynamic process noise; and
determine the first parameter value based on the first dynamic process noise.

42. The storage medium of claim 36, wherein the processor-readable instructions to cause the processor to determine the first position estimate hypothesis comprise processor-readable instructions to cause the processor to determine the first position estimate hypothesis using a first dynamic model with a first combination of first position seed value and first process noise, and the processor-readable instructions to cause the processor to determine the second position estimate hypothesis comprise processor-readable instructions to cause the processor to determine the second position estimate hypothesis using a second dynamic model with a second combination of second position seed value and second process noise that is different from the first combination of the first position seed value and first the process noise.

43. The storage medium of claim 42, further comprising processor-readable instructions to cause the processor to:
determine a candidate position estimate based on measurements that correspond to a highest-quality position estimate hypothesis, of the first position estimate hypothesis and the second position estimate hypothesis, and that meet at least one first measurement criterion; and
select the candidate position estimate as the reported position estimate in response to the candidate position estimate satisfying at least one quality of service criterion.

44. The storage medium of claim 42, further comprising processor-readable instructions to cause the processor to:
determine a first candidate position estimate based on measurements that correspond to a highest-quality position estimate hypothesis, of the first position estimate hypothesis and the second position estimate hypothesis, and that meet at least one first measurement criterion;
determine, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and
select the second candidate position estimate as the reported position estimate in response to the second candidate position estimate satisfying the at least one quality of service criterion.

45. The storage medium of claim 36, wherein the processor-readable instructions to cause the processor to determine that the user equipment is line-of-sight to fewer than the threshold number of positioning signal sources comprise processor-readable instructions to cause the processor to determine that the user equipment is line-of-sight to fewer than the threshold number of positioning signal sources based on one or more reference position estimates for the user equipment.

46. The storage medium of claim 45, wherein the processor-readable instructions to cause the processor to determine that the user equipment is line-of-sight to fewer than the threshold number of positioning signal sources comprise processor-readable instructions to cause the processor to determine that the user equipment is line-of-sight to fewer than the threshold number of positioning signal sources based further on one or more third measurements of the one or more positioning signals.

47. The storage medium of claim 46, further comprising processor-readable instructions to cause the processor to determine that the user equipment is line-of-sight to at least the threshold number of positioning signal sources in response to the one or more third measurements of the one or more positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources.

48. A user equipment comprising:
a receiver configured to receive positioning signals;
a memory; and
a processor, communicatively coupled to the receiver and the memory, configured to:
determine one or more position estimate hypotheses for the user equipment based on the positioning signals; and
determine that the user equipment is line-of-sight to fewer than a threshold number of positioning signal sources corresponding to the positioning signals based on the one or more position estimate hypotheses for the user equipment.

49. The user equipment of claim 48, wherein to determine that the user equipment is line-of-sight to fewer than the threshold number of positioning signal sources the processor is further configured to determine that a residual weighted sum squared error is above a first error threshold, or that a least-squared error is above a second error threshold, or that a weighted least-squared error is above a third error threshold, or that an uncertainty is above an uncertainty threshold, or that a quantity of positioning signal sources corresponding to the positioning signals is below a positioning signal source quantity threshold, or a combination of two or more thereof.

50. The user equipment of claim 48, wherein the processor is further configured to determine that the user equipment is line-of-sight to fewer than the threshold number of positioning signal sources corresponding to the positioning signals based further on one or more measurements of the positioning signals.

51. The user equipment of claim 50, wherein the processor is further configured to determine that the user equipment is line-of-sight to at least the threshold number of positioning signal sources in response to the one or more measurements of the positioning signals being indicative of the user equipment being line-of-sight to fewer than the threshold number of positioning signal sources and the one or more position estimate hypotheses for the user equipment being indicative of the user equipment being line-of-sight to at least the threshold number of positioning signal sources.

52. The user equipment of claim 48, wherein:
to determine the one or more position estimate hypotheses the processor is further configured to:
determine a first position estimate hypothesis for the user equipment using a first position estimating process and one or more first measurements of one or more of the positioning signals; and
determine a second position estimate hypothesis for the user equipment using a second position estimating process and one or more second measurements of one or more of the positioning signals, wherein the second position estimating process uses at least one second parameter value that is absent from the first position estimating process or different from a first parameter value used by the first position estimating process; and
the processor is further configured to report a reported position estimate based on the first position estimate hypothesis or the second position estimate hypothesis in response to the user equipment being line-of-sight to fewer than the threshold number of positioning signal sources.

53. A method at a user equipment, the method comprising:
determining one or more position estimate hypotheses for the user equipment based on positioning signals; and
determining that the user equipment is line-of-sight to fewer than a threshold number of positioning signal sources corresponding to the positioning signals based on the one or more position estimate hypotheses for the user equipment.

54. The method of claim 53, wherein determining that the user equipment is line-of-sight to fewer than the threshold number of positioning signal sources comprises determine that a residual weighted sum squared error is above a first error threshold, or that a least-squared error is above a second error threshold, or that a weighted least-squared error is above a third error threshold, or that an uncertainty is above an uncertainty threshold, or that a quantity of positioning signal sources corresponding to the positioning signals is below a positioning signal source quantity threshold, or a combination of two or more thereof.

55. The method of claim 53, wherein the user equipment is determined to be line-of-sight to fewer than the threshold number of positioning signal sources corresponding to the positioning signals based further on one or more measurements of the positioning signals.

56. The method of claim 53, wherein:
determining the one or more position estimate hypotheses comprises:
determining a first position estimate hypothesis for the user equipment using a first position estimating process and one or more first measurements of one or more of the positioning signals; and
determining a second position estimate hypothesis for the user equipment using a second position estimating process and one or more second measurements of one or more of the positioning signals, wherein the second position estimating process uses at least one second parameter value that is absent from the first position estimating process or different from a first parameter value used by the first position estimating process; and
the method further comprises reporting a reported position estimate based on the first position estimate hypothesis or the second position estimate hypothesis in response to the user equipment being line-of-sight to fewer than the threshold number of positioning signal sources.

57. A user equipment comprising:
means for determining one or more position estimate hypotheses for the user equipment based on positioning signals; and
means for determining that the user equipment is line-of-sight to fewer than a threshold number of positioning signal sources corresponding to the positioning signals based on the one or more position estimate hypotheses for the user equipment.

58. The user equipment of claim 57, wherein the means for determining that the user equipment is line-of-sight to fewer than the threshold number of positioning signal sources comprise means for determining that a residual weighted sum squared error is above a first error threshold, or that a least-squared error is above a second error threshold, or that a weighted least-squared error is above a third error threshold, or that an uncertainty is above an uncertainty threshold, or that a quantity of positioning signal sources corresponding to the positioning signals is below a positioning signal source quantity threshold, or a combination of two or more thereof.

59. The user equipment of claim 57, wherein the means for determining that the user equipment is line-of-sight to fewer than the threshold number of positioning signal sources comprise means for determining that the user equipment is line-of-sight to fewer than the threshold number of positioning signal sources corresponding to the positioning signals based further on one or more measurements of the positioning signals.

60. The user equipment of claim 59, further comprising means for determining that the user equipment is line-of-sight to at least the threshold number of positioning signal sources in response to the one or more measurements of the positioning signals being indicative of the user equipment being line-of-sight to fewer than the threshold number of positioning signal sources and the one or more position estimate hypotheses for the user equipment being indicative of the user equipment being line-of-sight to at least the threshold number of positioning signal sources.

61. The user equipment of claim 57, wherein:
the means for determining the one or more position estimate hypotheses comprises:
means for determining a first position estimate hypothesis for the user equipment using a first position estimating process and one or more first measurements of one or more of the positioning signals; and
means for determining a second position estimate hypothesis for the user equipment using a second position estimating process and one or more second measurements of one or more of the positioning signals, wherein the second position estimating process uses at least one second parameter value that is absent from the first position estimating process or different from a first parameter value used by the first position estimating process; and
the user equipment further comprises means for reporting a reported position estimate based on the first position estimate hypothesis or the second position estimate hypothesis in response to the user equipment being line-of-sight to fewer than the threshold number of positioning signal sources.

62. A non-transitory, processor-readable storage medium comprising processor-readable instructions to cause a processor to:
determine one or more position estimate hypotheses for a user equipment based on positioning signals; and
determine that the user equipment is line-of-sight to fewer than a threshold number of positioning signal sources corresponding to the positioning signals based on the one or more position estimate hypotheses for the user equipment.

63. The user equipment of claim 62, wherein the processor-readable instructions to cause the processor to determine that the user equipment is line-of-sight to fewer than the threshold number of positioning signal sources comprise processor-readable instructions to cause the processor to determine that a residual weighted sum squared error is above a first error threshold, or that a least-squared error is above a second error threshold, or that a weighted least-squared error is above a third error threshold, or that an uncertainty is above an uncertainty threshold, or that a quantity of positioning signal sources corresponding to the positioning signals is below a positioning signal source quantity threshold, or a combination of two or more thereof.

64. The user equipment of claim 62, wherein the processor-readable instructions to cause the processor to determine that the user equipment is line-of-sight to fewer than the threshold number of positioning signal sources comprise processor-readable instructions to cause the processor to determine that the user equipment is line-of-sight to fewer than the threshold number of positioning signal sources corresponding to the positioning signals based further on one or more measurements of the positioning signals.

65. The user equipment of claim 64, further comprising processor-readable instructions to cause the processor to determine that the user equipment is line-of-sight to at least the threshold number of positioning signal sources in response to the one or more measurements of the positioning signals being indicative of the user equipment being line-of-sight to fewer than the threshold number of positioning signal sources and the one or more position estimate hypotheses for the user equipment being indicative of the user equipment being line-of-sight to at least the threshold number of positioning signal sources.

66. The user equipment of claim 62, wherein:
the processor-readable instructions to cause the processor to determine the one or more position estimate hypotheses comprises processor-readable instructions to cause the processor to:
determine a first position estimate hypothesis for the user equipment using a first position estimating process and one or more first measurements of one or more of the positioning signals; and
determine a second position estimate hypothesis for the user equipment using a second position estimating process and one or more second measurements of one or more of the positioning signals, wherein the second position estimating process uses at least one second parameter value that is absent from the first position estimating process or different from a first parameter value used by the first position estimating process; and
the storage medium further comprises processor-readable instructions to cause the processor to report a reported position estimate based on the first position estimate hypothesis or the second position estimate hypothesis in response to the user equipment being line-of-sight to fewer than the threshold number of positioning signal sources.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
   a receiver configured to receive one or more positioning signals;
   a memory; and
   a processor, communicatively coupled to the receiver and the memory, configured to:
   determine that the user equipment is line-of-sight relative to fewer than a threshold number of positioning signal sources;
   determine a first position estimate hypothesis for the user equipment using one or more first measurements of the one or more positioning signals in a first position estimating process;
   determine a second position estimate hypothesis for the user equipment using one or more second measurements of the one or more positioning signals in a second position estimating process, wherein the second position estimating process uses a second parameter value of a parameter and the parameter is absent from the first position estimating process or has a first parameter value that is different from the second parameter value;
   report a reported position estimate based on the first position estimate hypothesis or the second position estimate hypothesis in response to the user equipment being line-of-sight to fewer than the threshold number of positioning signal sources;
   determine a dynamic process noise based on at least one of an uncertainty of a position fix for the user equipment, motion of the user equipment, environment context, user dynamics, or position offset with respect to a previously-determined position of the user equipment; and
   determine the second parameter value based on the dynamic process noise.

2. The user equipment of claim 1, wherein the processor is further configured to:
   Determine a third position estimate hypothesis for the user equipment using a third position estimating process that uses a third parameter value;
   determine the second parameter value by applying process noise relative to the first position estimating process; and
   determine the third parameter value by applying the process noise relative to the second position estimating process.

3. The user equipment of claim 1, wherein the second parameter value comprises an initial position estimate of the user equipment.

4. The user equipment of claim 1, wherein the dynamic process noise is second dynamic process noise, and wherein the processor is further configured to:
   determine first dynamic process noise; and
   determine the first parameter value based on the first dynamic process noise.

5. The user equipment of claim 1, wherein the processor is further configured to determine the first position estimate hypothesis using a first dynamic model with a first combination of first position seed value and first process noise and to determine the second position estimate hypothesis using a second dynamic model with a second combination of second position seed value and second process noise that is different from the first combination of the first position seed value and the first process noise.

6. The user equipment of claim 5, wherein the processor is further configured to:
   determine a candidate position estimate based on measurements that correspond to a highest-quality position estimate hypothesis, of the first position estimate hypothesis and the second position estimate hypothesis, and that meet at least one first measurement criterion; and
   select the candidate position estimate as the reported position estimate in response to the candidate position estimate satisfying at least one quality of service criterion.

7. The user equipment of claim 5, wherein the processor is further configured to:
   determine a first candidate position estimate based on measurements that correspond to a highest-quality position estimate hypothesis, of the first position estimate hypothesis and the second position estimate hypothesis, and that meet at least one first measurement criterion;
   determine, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and
   select the second candidate position estimate as the reported position estimate in response to the second candidate position estimate satisfying the at least one quality of service criterion.

8. The user equipment of claim 1, wherein the processor is further configured to determine that the user equipment is line-of-sight to fewer than the threshold number of positioning signal sources based on one or more reference position estimates for the user equipment.

9. The user equipment of claim 8, wherein the processor is further configured to determine that the user equipment is line-of-sight to fewer than the threshold number of positioning signal sources based further on one or more third measurements of the one or more positioning signals.

10. The user equipment of claim 9, wherein the processor is further configured to determine that the user equipment is line-of-sight to at least the threshold number of positioning signal sources in response to the one or more third measurements of the one or more positioning signals being indicative of the user equipment being line-of-sight to fewer than the threshold number of positioning signal sources and the one or more reference position estimates for the user equipment being indicative of the user equipment being line-of-sight to at least the threshold number of positioning signal sources.

11. A position estimate reporting method comprising:
    receiving, at a user equipment, one or more positioning signals;
    determining that the user equipment is line-of-sight relative to fewer than a threshold number of positioning signal sources;
    determining a first position estimate hypothesis for the user equipment using one or more first measurements of the one or more positioning signals in a first position estimating process;

determining a second position estimate hypothesis for the user equipment using one or more second measurements of the one or more positioning signals in a second position estimating process, wherein the second position estimating process uses a second parameter value of a parameter and the parameter is absent from the first position estimating process or has a first parameter value that is different from the second parameter value;

reporting a reported position estimate based on the first position estimate hypothesis or the second position estimate hypothesis in response to the user equipment being line-of-sight to fewer than the threshold number of positioning signal sources;

determining a dynamic process noise based on at least one of an uncertainty of a position fix for the user equipment, motion of the user equipment, environment context, user dynamics, or position offset with respect to a previously-determined position of the user equipment; and determining the second parameter value based on the dynamic process noise.

12. The position estimate reporting method of claim 11, further comprising:
determining a third position estimate hypothesis for the user equipment using a third position estimating process that uses a third parameter value;
determining the second parameter value by applying process noise relative to the first position estimating process; and
determining the third parameter value by applying the process noise relative to the second position estimating process.

13. The position estimate reporting method of claim 11, wherein the second parameter value comprises an initial position estimate of the user equipment.

14. The position estimate reporting method of claim 11, wherein the dynamic process noise is second dynamic process noise, and the position estimate reporting method further comprises:
determining first dynamic process noise; and
determining the first parameter value based on the first dynamic process noise.

15. The position estimate reporting method of claim 11, wherein the first position estimate hypothesis is determined using a first dynamic model with a first combination of first position seed value and first process noise and the second position estimate hypothesis is determined using a second dynamic model with a second combination of second position seed value and second process noise that is different from the first combination of the first position seed value and the first process noise.

16. The position estimate reporting method of claim 15, further comprising:
determining a candidate position estimate based on measurements that correspond to a highest-quality position estimate hypothesis, of the first position estimate hypothesis and the second position estimate hypothesis, and that meet at least one first measurement criterion; and
selecting the candidate position estimate as the reported position estimate in response to the candidate position estimate satisfying at least one quality of service criterion.

17. The position estimate reporting method of claim 15, further comprising:
determining a first candidate position estimate based on measurements that correspond to a highest-quality position estimate hypothesis, of the first position estimate hypothesis and the second position estimate hypothesis, and that meet at least one first measurement criterion;
determining, in response to the first candidate position estimate failing to satisfy at least one quality of service criterion, a second candidate position estimate based on measurements that correspond to the highest-quality position estimate hypothesis, of the first position estimate hypothesis and the second position estimate hypothesis, and that meet at least one second measurement criterion that is easier to meet than the at least one first measurement criterion; and
selecting the second candidate position estimate as the reported position estimate in response to the second candidate position estimate satisfying the at least one quality of service criterion.

18. The position estimate reporting method of claim 11, wherein the user equipment is determined to be line-of-sight to fewer than the threshold number of positioning signal sources based on one or more reference position estimates for the user equipment.

19. The position estimate reporting method of claim 18, wherein the user equipment is determined to be line-of-sight to fewer than the threshold number of positioning signal sources based further on one or more third measurements of the one or more positioning signals.

20. A user equipment comprising:
means for receiving one or more positioning signals;
means for determining that the user equipment is line-of-sight relative to fewer than a threshold number of positioning signal sources;
means for determining a first position estimate hypothesis for the user equipment using one or more first measurements of the one or more positioning signals in a first position estimating process;
means for determining a second position estimate hypothesis for the user equipment using one or more second measurements of the one or more positioning signals in a second position estimating process, wherein the second position estimating process uses a second parameter value of a parameter and the parameter is absent from the first position estimating process or has a first parameter value that is different from the second parameter value;
means for reporting a reported position estimate based on the first position estimate hypothesis or the second position estimate hypothesis in response to the user equipment being line-of-sight to fewer than the threshold number of positioning signal sources;
means for determining a dynamic process noise based on at least one of an uncertainty of a position fix for the user equipment, motion of the user equipment, environment context, user dynamics, or position offset with respect to a previously-determined position of the user equipment; and
means for determining the second parameter value based on the dynamic process noise.

21. The user equipment of claim 20, further comprising:
means for determining a third position estimate hypothesis for the user equipment using a third position estimating process that uses a third parameter value;

means for determining the second parameter value by applying process noise relative to the first position estimating process; and means for determining the third parameter value by applying the process noise relative to the second position estimating process.

22. The user equipment of claim 20, wherein the second parameter value comprises an initial position estimate of the user equipment.

23. A non-transitory, processor-readable storage medium comprising processor-readable instructions to cause a processor to:

determine that a user equipment is line-of-sight relative to fewer than a threshold number of positioning signal sources;

determine a first position estimate hypothesis for the user equipment using one or more first measurements of one or more positioning signals in a first position estimating process;

determine a second position estimate hypothesis for the user equipment using one or more second measurements of the one or more positioning signals in a second position estimating process, wherein the second position estimating process uses a second parameter value of a parameter and the parameter is absent from the first position estimating process or has a first parameter value that is different from the second parameter value;

report a reported position estimate based on the first position estimate hypothesis or the second position estimate hypothesis in response to the user equipment being line-of-sight to fewer than the threshold number of positioning signal sources;

determine a dynamic process noise based on at least one of an uncertainty of a position fix for the user equipment, motion of the user equipment, environment context, user dynamics, or position offset with respect to a previously-determined position of the user equipment; and determine the second parameter value based on the dynamic process noise.

* * * * *